US009357492B2

(12) United States Patent
Malik et al.

(10) Patent No.: US 9,357,492 B2
(45) Date of Patent: May 31, 2016

(54) WLAN-CAPABLE REMOTE CONTROL DEVICE

(71) Applicant: QUALCOMM Incorporated, San Diego, CA (US)

(72) Inventors: Rahul Malik, San Diego, CA (US); Peerapol Tinnakornsrisuphap, San Diego, CA (US); Qi Xue, San Diego, CA (US); Bibhu Prasad Mohanty, San Diego, CA (US); Kevin Neal Hayes, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 14/279,079

(22) Filed: May 15, 2014

(65) Prior Publication Data

US 2015/0036573 A1    Feb. 5, 2015

Related U.S. Application Data

(60) Provisional application No. 61/862,270, filed on Aug. 5, 2013.

(51) Int. Cl.
*H04W 52/02* (2009.01)
*G08C 17/02* (2006.01)

(52) U.S. Cl.
CPC ........... *H04W 52/0254* (2013.01); *G08C 17/02* (2013.01); *G08C 2201/12* (2013.01); *G08C 2201/50* (2013.01)

(58) Field of Classification Search
None
See application file for complete search history.

(56) References Cited

U.S. PATENT DOCUMENTS

| | | | |
|---|---|---|---|
| 3,806,804 A | | 4/1974 | Mills et al. |
| 5,854,593 A | * | 12/1998 | Dykema .................... 340/12.23 |
| 7,577,180 B2 | | 8/2009 | Boulton |
| 8,155,061 B2 | * | 4/2012 | Nielsen .................. G08C 17/02 370/329 |
| 8,223,001 B2 | | 7/2012 | Sutardja |

(Continued)

FOREIGN PATENT DOCUMENTS

| | | |
|---|---|---|
| CA | 2717641 | 4/2011 |
| CN | 202758480 | 2/2013 |

(Continued)

OTHER PUBLICATIONS

"PCT Application No. PCT/US2014/049678, International Search Report", Feb. 10, 2015, 15 pages.
"PCT Application No. PCT/US2014/049678, Invitation to Pay Additional Fees and Partial Search Report", Nov. 20, 2014, 6 pages.

*Primary Examiner* — Hassan Kizou
*Assistant Examiner* — Hashim Bhatti
(74) *Attorney, Agent, or Firm* — DeLizio Law, PLLC

(57) ABSTRACT

Operations for a WLAN-capable remote control device and a controlled device are disclosed. A first network device (e.g., remote control) may receive a user input for controlling operation of a second network device (e.g., controlled device) of a communication network. The first network device may transition to an active operating state in response to receiving the user input. The first network device may transmit the first user input to the second network device. The first network device may exit the active operating state in response to successfully transmitting the first user input to the second network device.

39 Claims, 16 Drawing Sheets

(56) References Cited

U.S. PATENT DOCUMENTS

| | | |
|---|---|---|
| 2008/0170590 A1 | 7/2008 | Lee et al. |
| 2009/0077405 A1* | 3/2009 | Johansen ............ H04L 65/607 713/323 |
| 2010/0302461 A1* | 12/2010 | Lim ................ H04N 5/4403 348/734 |
| 2011/0018731 A1 | 1/2011 | Linsky et al. |
| 2011/0213876 A1* | 9/2011 | Kumar .................. H04L 67/16 709/224 |
| 8,405,606 B2 | 3/2013 | Auguste et al. |
| 2004/0203697 A1 | 10/2004 | Finn |
| 2008/0151795 A1* | 6/2008 | Shorty ............... H04L 12/2838 370/310 |

(Continued)

FOREIGN PATENT DOCUMENTS

| | | |
|---|---|---|
| EP | 1515497 | 3/2005 |
| EP | 2448357 | 5/2012 |
| WO | 2007142562 | 12/2007 |
| WO | 2015020994 | 2/2015 |

* cited by examiner

WLAN-CAPABLE REMOTE CONTROL DEVICE

RELATED MATTERS

This application claims priority benefit of U.S. Provisional Patent Application Ser. No. 61/862,270 filed on Aug. 5, 2013.

BACKGROUND

Embodiments of the disclosure generally relate to the field of communication networks and, more particularly, to power conservation for WLAN-capable remote control devices.

A communication device typically implements power saving mechanisms by operating in a power save mode to conserve power and reduce energy consumption. In the power save mode, the communication device can temporarily suspend transmission and reception of packets, thus reducing the average power consumption of the communication device. For example, the communication device may temporarily disable one or more components in the power save mode and may enable the components after exiting the power save mode.

SUMMARY

Various embodiments for power conservation for a WLAN-capable remote control device are disclosed. In some embodiments, a first network device may transition to an active operating state in response to receiving a user input for controlling operation of a second network device. The first network device may transmit the first user input to the second network device. The first network device may exit the active operating state in response to successfully transmitting the first user input to the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the disclosure. However, it is understood that the described embodiments may be practiced without these specific details. For example, although power conservation operations can be implemented by a wireless local area network (WLAN) device (e.g., IEEE 802.11n compatible network device), embodiments are not so limited. In other embodiments, the power conservation operations described herein can be executed by network devices that implement other suitable communication protocols (e.g., IEEE 802.11b/g/ac/ad/ah, Wi-Fi Direct™, long-term evolution (LTE), 3G, 4G, etc.). In other instances, well-known instruction instances, protocols, structures, and techniques have not been shown in detail in order not to obfuscate the description.

A remote control can be used to control operations of a network device, such as a television, a set-top-box (STB), a media player, etc. In some implementations, a remote control may be a battery-operated device with a limited communication range and/or a limited amount of available power. For example, the remote control may be a WLAN-capable remote control that utilizes WLAN communication protocols to communicate with and control operation of another network device. Using WLAN communication protocols for remote control communication can allow for high data rate applications including gesture interaction, touchpad interaction, voice interaction, wireless headset functionality via the remote control, display via the remote control, etc. Using WLAN communication protocols for remote control communication can be cost effective when the controlled network device has existing WLAN capabilities for Internet connectivity. In such an environment, using a WLAN-capable remote control can preclude the need for additional transceiver and processing components to enable remote control communication at the controlled network device. For example, using a WLAN-capable remote control can preclude the need for infrared (IR) detection and processing components at the controlled network device. However, because WLAN may be a power-intensive communication protocol, implementing a WLAN-capable remote control can drain the battery power of the remote control. As will be further described below, the WLAN-capable remote control and the WLAN-capable network device can be configured to implement a low-power communication protocol for power conservation. The power conservation mechanism described herein can help optimize battery life of the WLAN-capable remote control.

Figure 1:
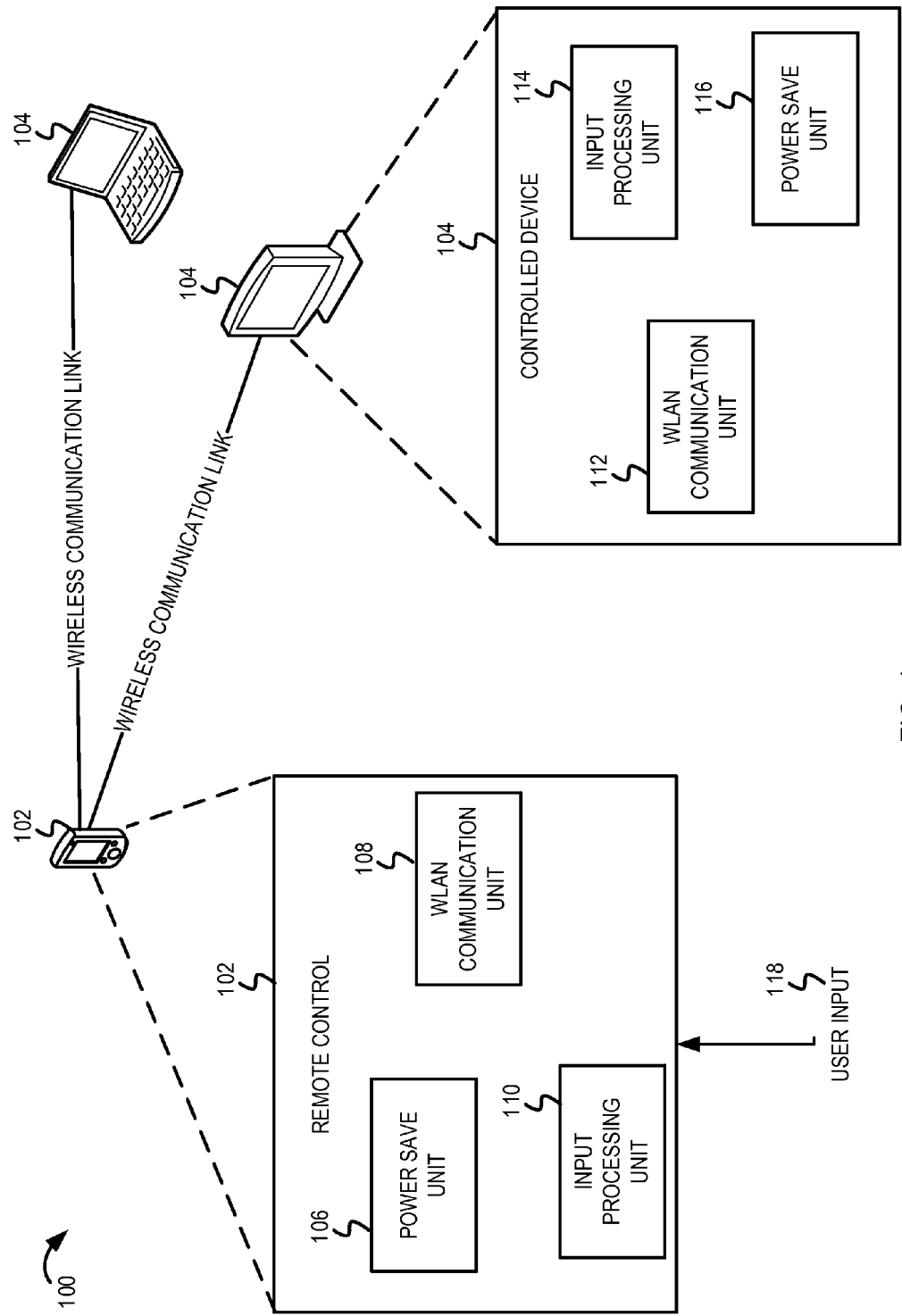
FIG. 1 is a block diagram illustrating example operations of a WLAN-capable remote control in a communication network.

FIG. 1 is a block diagram illustrating example operations of a WLAN-capable remote control in a communication network 100. The communication network 100 includes a remote control 102 and a controlled device 104. The remote control 102 includes a power save unit 106, a WLAN communication unit 108, and an input processing unit 110. The controlled device 104 includes a WLAN communication unit 112, an input processing unit 114, and a power save unit 116. In some embodiments, the remote control 102 and the controlled device 104 may use WLAN communication protocols to operate in an ad-hoc mode. In the ad-hoc mode, the WLAN communication units 108 and 112 may exchange messages to establish a direct WLAN communication link between the remote control 102 and the controlled device 104. For example, the WLAN communication units 108 and 112 may implement any suitable communication protocol, such as Wi-Fi Direct communication protocols, tunneled direct link setup (TDLS) communication protocols, peer-to-peer communication protocols, wireless mesh communication protocols, etc. for operation in the ad-hoc mode. In other embodiments, the remote control 102 and the controlled device 104 may use WLAN communication protocols (e.g., IEEE 802.11n communication protocols) to operate in an infrastructure mode. In the infrastructure mode, the remote control 102 and the controlled device 104 may communicate via an access point or another intermediate coordinating network device. For example, the WLAN communication units 108 and 112 may exchange messages via the intermediate coordinating device to establish a WLAN communication link between the remote control 102 and the controlled device 104. In some embodiments, the WLAN communication units 108 and 112 can include one or more radio transceivers, analog front end (AFE) units, antennas, processors, memory, other logic, and/or other components to implement the communication protocols and related functionality.

In one example, the controlled device 104 can be a WLAN-enabled television. The remote control 102 can use WLAN communication protocols to control the operation of the television based on user input 118 detected by the input processing unit 110. In other embodiments, the controlled device 104 can be a cable television set-top box, a laptop computer, a tablet computer, a gaming console, a media player, a smart appliance, or another suitable electronic device that can be controlled by a remote control. In some embodiments, the remote control 102 may be a dedicated controller device. In other embodiments, the remote control 102 may be implemented in an application on an electronic device, such as a mobile device (e.g., smartphone, tablet, etc.) or a wearable device (e.g., a smart watch). The electronic device may execute the application and allow the user to provide a remote control input via a user interface. In some embodiments, in addition to WLAN communication protocols, the controlled device 104 may be configured to communicate with other network devices using other suitable communication protocols (e.g., Bluetooth®, WiMAX, Ethernet, powerline communication (PLC), etc.). For example, the controlled device 104 can include one or more radio transceivers, AFE units, antennas, processors, memory, and/or other logic to implement the communication protocols and related functionality.

In some embodiments, the remote control 102 may wirelessly establish a direct communication link with the controlled device 104 (e.g., using TDLS communication protocols, Wi-Fi direct communication protocols, etc.). However, in other embodiments, the remote control 102 may wirelessly connect to the controlled device 104 via an access point (or a network gateway). In this example, the remote control 102 may control the controlled device 104 via the access point. In yet another embodiment, the remote control 102 may wirelessly connect to the controlled device 104 via another suitable intermediate network device (e.g., not necessarily an access point). The remote control 102 may transmit messages (e.g., user input) to the controlled device 104 via the intermediate network device; and may receive messages from the controlled device 104 via the intermediate network device. In some embodiments, the remote control 102 and the intermediate network device may exchange communications using one communication protocol; while the intermediate network device and the controlled device 104 may exchange communications using another communication protocol. For example, the remote control 102 and the intermediate network device may exchange communications using WLAN communication protocols; while the intermediate network device and the controlled device 104 may exchange communications using Ethernet communication protocols. In some embodiments, the intermediate network device may execute one or more operations of the remote control 102 and/or the controlled device 104. In some embodiments, the remote control 102 may wirelessly establish a direct communication link with both the controlled device 104 and the access point. In one embodiment, the remote control 102 can be a dedicated controller device configured to control the operation of the controlled device 104. The dedicated controller device may or may not include an integrated display unit. In another embodiment, functionality of the remote control 102 may be integrated into another suitable electronic device, such as a smartphone, a tablet computer, wearable device, etc. In yet another embodiment, the functionality of the remote control 102 may be implemented in an application that is executed by the electronic device (e.g., executed by a processor of the electronic device). The electronic device may execute the application and allow the user to provide a remote control input via a user interface.

Although not depicted in FIG. 1, in some embodiments, the communication network 100 may also include an access point, a network gateway, and/or another suitable network device. The controlled device 104 may also connect to and communicate with multiple network devices in the communication network 100. For example, the controlled device 104 may connect to a network gateway to receive content from an external communication network (e.g., the Internet). As another example, the controlled device 104 may also connect to and exchange data with a tablet computer, a smartphone, a camera, a laptop computer, a wearable device, and/or another suitable smart appliance. The controlled device 104 may connect to the network devices using WLAN communication protocols (e.g., IEEE 802.11 communication protocols), PLC communication protocols (e.g., HomePlug AV), and/or another suitable communication protocols.

In some embodiments, the remote control 102 may initiate all communications exchanged between the remote control 102 and the controlled device 104. For example, the remote control 102 may initiate communications with the controlled device 104 in response to the input processing unit 110 detecting a user input 118. For example, the input processing unit 110 may receive an indication if the user presses a physical button on the remote control 102. As another example, the input processing unit 110 may receive an indication from a microphone or other audio sensor if the user provides a voice input. As another example, the input processing unit 110 may receive an indication from a gyroscope, accelerometer, another suitable motion sensor, a camera, and/or another suitable machine vision detector if the user provides a gesture input. As another example, the input processing unit 110 may receive an indication from a pressure sensor or another suitable sensor integrated with a remote control touchscreen if the user activates a virtual button on the remote control 102. In other embodiments, the input processing unit 110 may detect other suitable types of user input 118, such as activation of another suitable trigger mechanism, a mouse click, a stylus-based selection, motion of a wearable input-providing device, etc. Furthermore, in some embodiments, the input processing unit 110 may include the audio sensor, motion sensors, touch-screen sensors, etc. for detecting various types of user inputs 118. In some embodiments, the controlled device 104 may be configured to operate as an access point with respect to the remote control 102. In this embodiment, the controlled device 104 may operate in a non-beaconing operating mode. For example, the WLAN communication unit 112 of the controlled device 104 may not transmit beacon messages to the remote control 102 at periodic intervals and may not synchronize with the remote control 102. Because the controlled device 104 does not generate beacon messages for the remote control 102 or periodically advertise its presence to the remote control 102, the remote control 102 may operate independent of and asynchronous to the controlled device 104. Thus, the remote control 102 may not monitor and synchronize with the controlled device 104. In some implementations, the remote control 102 may switch to the active operating state and transmit messages at any time instant without having to wait for the beacon message from the controlled device 104. Typically, network devices that are communicatively coupled with each other periodically exchange "keep alive" messages to determine whether the communication link between the two network devices is operational and/or to prevent the communication link from being terminated. However, because the remote control 102 operates independent of and asynchronous to the controlled device 104, in some implementations the remote control 102 may not periodically exchange keep alive messages with the controlled device 104. Thus, both the state of the communication session and the upper protocol layers (e.g., IP layer) may be preserved across any periods of inactivity of the remote control 102.

For power conservation at the remote control 102, the power save unit 106 can maintain the remote control 102 in a deep sleep state ("inactive operating state") or in a low-power state ("sleep operating state") until the input processing unit 110 receives the user input 118. As will be further described below, when the input processing unit 110 of the remote control 102 receives the user input 118, the remote control 102 can transition from the inactive operating state to the active operating state or from the sleep operating state to the active operating state. For power conservation at the controlled device 104, the power save unit 116 can cause the controlled device 104 to periodically transition between the sleep operating state and the active operating state. In some embodiments, the sleep operating state can be a low-power operating state. In some embodiments, communication components of the controlled device 104 (e.g., the WLAN communication unit 112) may be disabled in the sleep operating state. Accordingly, the controlled device 104 may not transmit or receive communications in the sleep operating state. In some embodiments, the processing components and the communication components of the controlled device 104 may be enabled in the active operating state. Accordingly, the controlled device 104 may transmit or receive communications in the active operating state. The time interval for which the controlled device 104 is configured in the sleep operating state ("sleep interval") and the time interval for which the controlled device 104 is configured in the active operating state ("active interval") may be determined based on various factors. For example, the sleep interval and the active interval may be determined based, at least in part, on power consumption specifications of the controlled device 104 and a maximum allowable latency between a user providing the user input 118 (e.g., pressing a button on the remote control 102) and the controlled device 104 receiving the user input 118.

Figure 2:
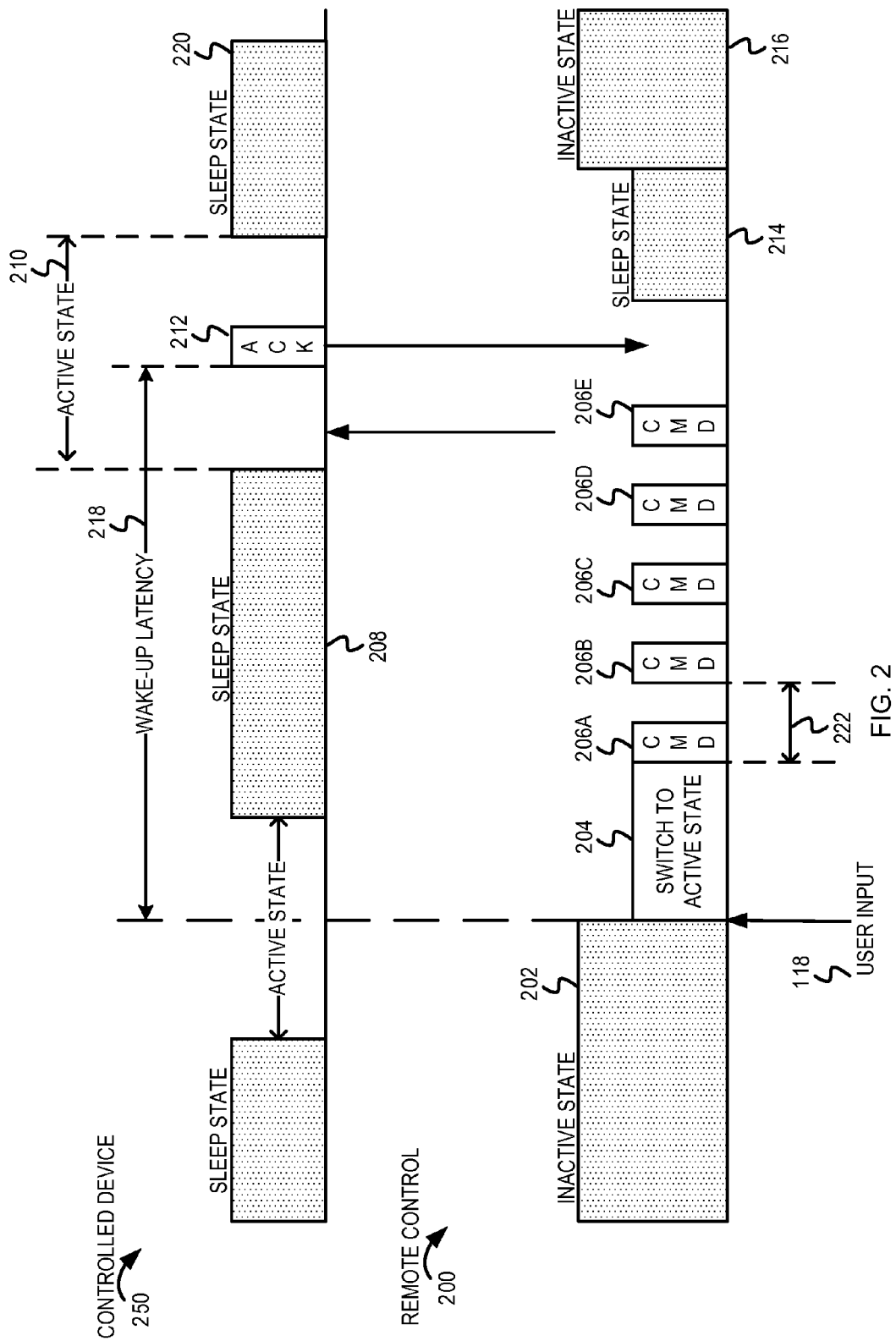
FIG. 2 is a timing diagram illustrating example operations of a WLAN-capable remote control.

FIG. 2 is a timing diagram illustrating example operations of a WLAN-capable remote control. In FIG. 2, timing diagram 200 depicts operations of the remote control 102 and timing diagram 250 depicts operations of the controlled device 104. Although not depicted in FIG. 2, the controlled device 104 may be switched on and paired with the remote control 102 before the operations of FIG. 2 are executed. While there is no user input, the remote control 102 is configured in an inactive operating state (time interval 202). The inactive operating state can be a "deep sleep" operating state. For example, processing components and communication components of the remote control 102 (e.g., the WLAN communication unit 108) may be partially or fully disabled in the inactive operating state. In response to detecting a user input, the remote control 102 transitions from the inactive operating state to the active operating state, during time interval 204. For example, the power save unit 106 can cause the remote control 102 to transition to the active operating state when the user presses a power ON button of the remote control 102. In other embodiments, the remote control 102 may transition to the active operating state in response to other suitable user inputs, such as activation of any virtual/physical button of the remote control, a voice command, a gesture command, etc. During the time interval 204, the remote control 102 may activate the previously disabled processing components and communication components of the remote control 102.

The input processing unit 110 of the remote control 102 generates a command message (CMD) 206A in response to detecting the user input 118 at the remote control 102. The WLAN communication unit 108 of the remote control 102 transmits the command message 206A to the controlled device 104. However, as depicted in the timing diagram 250, the controlled device 104 periodically transitions between the sleep operating state and the active operating state. The sleep operating state can be a low-power operating state between the active operating state and the inactive operating state. For example, in the sleep operating state, the power save unit 116 may not disable all of the processing components and communication components of the controlled device 104. This can allow for a faster transition between the sleep and the active operating states as compared to between the inactive and the active operating states. However, the controlled device 104 may not transmit or receive communications during the sleep operating state. In FIG. 2, the inactive operating state and the sleep operating state are depicted using dot-filled blocks. The inactive operating state is depicted using a raised block as compared to the sleep operating state. In the example of FIG. 2, the controlled device 104 is configured in the sleep operating state during sleep interval 208, which is when the remote control 102 transmits the command message 206A. Therefore, the controlled device 104 does not receive the command message 206A and does not transmit a corresponding acknowledgment message. If the WLAN communication unit 108 does not receive the acknowledgment message within a predetermined acknowledgment time interval, the WLAN communication unit 108 can retransmit the command message until the controlled device 104 acknowledges receipt of the command message. As depicted in FIG. 2, the remote control 102 unsuccessfully retransmits command messages 206B, 206C, and 206D to the controlled device 104. The time interval between successive retransmissions of the command message (e.g., between transmission of the command messages 206A and 206B) is referred to as a command repetition interval 222. The remote control 102 may determine the command repetition interval 222 based, at least in part, on knowledge of the active interval of the controlled device 104, knowledge of the sleep interval of the controlled device 104, and/or a desired probability of success in transmitting the command message to the controlled device 104. The controlled device 104 receives the retransmitted command message 206E when the controlled device 104 transitions to the active operating state during active time interval 210. The WLAN communication unit 112 of the controlled device 104 then transmits an acknowledgment message 212 to the remote control 102. The controlled device 104 can then transition back to the sleep operating state for sleep interval 220.

In some embodiments, as depicted in FIG. 2, the remote control 102 may not transition back to the inactive operating state as soon as it receives the acknowledgment message 212. Instead, the remote control 102 may temporarily transition from the active operating state to the sleep operating state during the time interval 214, in anticipation of receiving another user input. As discussed above, the sleep operating state can be an intermediate low-power operating state between the active operating state and the inactive operating state. For example, the power save unit 106 may not disable all the processing components and communication components of the remote control 102 in the sleep operating state. Thus, the response time for transitioning from the sleep operating state to the active operating state may be less than the response time for transitioning from the inactive operating state to the active operating state. The remote control 102 may remain in the sleep operating state for a time interval 214. The time interval 214 may be selected by optimizing the amount of power and latency associated with transitioning from the inactive operating state to the active operating state versus the amount of power and latency associated with remaining in the sleep operating state. For example, the remote control 102 can estimate the power consumed by various processing and communication components to transition from the sleep operating state to the active operating state, the power consumed by various processing and communication components to transition from the inactive operating state to the active operating state, the time required for the processing and communication components to transition from the sleep operating state to the active operating state, and/or the time required for the processing and communication components to transition from the inactive operating state to the active operating state. The remote control 102 can determine the time interval 214 as a combination of these power and time values. In FIG. 2, the remote control 102 does not receive any user input during the time interval 214 while the remote control is configured in the sleep operating state. Therefore, after the time interval 214 elapses, the remote control 102 can infer that the user does not wish to control the controlled device 104. After the time interval 214 elapses, the remote control 102 transitions from the sleep operating state to the inactive operating state (time interval 216).

As depicted in FIG. 2, the time interval between the remote control 102 detecting the user input 118 and the controlled device 104 transmitting the acknowledgment message 212 is referred to as the wake-up latency 218 of the controlled device 104. The wake-up latency 218 may be a function of the active interval and the sleep interval of the controlled device 104. In some embodiments, the controlled device 104 can select and/or vary the active interval and sleep interval to achieve a balance between power conservation at the controlled device 104 and minimizing the wake-up latency 218.

In some embodiments, the duty cycle (i.e., the sleep interval and the active interval) of the controlled device 104 can be predetermined. In other embodiments, however, the power save unit 116 may dynamically adjust the duty cycle of the controlled device 104 based on channel activity measurements or the amount of traffic detected during the active interval. For example, the WLAN communication protocol implements a carrier sense multiple access (CSMA) protocol, where WLAN-capable network devices "listen before talk." Thus, a WLAN-capable network device senses a communication channel before initiating a transmission and defers the transmission if another transmission is detected on the communication channel. Therefore, in a high traffic environment, the remote control 102 may not have an opportunity to transmit a message to the controlled device 104 during the active interval of the controlled device 104. In some embodiments, while the controlled device 104 is configured in the active operating state, the WLAN communication unit 112 may monitor the communication channel. If the WLAN communication unit 112 determines that the communication channel was busy during the active interval, the power save unit 116 can infer that the remote control 102 may not have had an opportunity to transmit a message to the controlled device 104. Accordingly, the power save unit 116 can extend the active interval by a predetermined time interval. This can allow the remote control 102 to transmit a message to the controlled device 104 (if needed). For example, if the controlled device 104 has an Xms active interval, the controlled device 104 can remain in the active operating state until the communication channel is idle. After the communication channel is idle, the controlled device 104 can remain in the active operating state for an additional Xms to ensure that the remote control 102 has an opportunity to transmit a message to the controlled device 104 (if needed). However, in other embodiments, after the communication channel is idle, the controlled device 104 can remain in the active operating state for an additional time interval (e.g., Yms) that is different from the active interval (e.g., Xms). The additional time interval may be determined based, at least in part, on the active interval of the controlled device 104. For example, the additional time interval may be a predetermined percentage of the active interval. As another example, the additional time interval may be a predetermined multiple of the active interval. Thus, the power save unit 116 can temporarily suspend power conservation specifications of the controlled device 104 in favor of minimizing the wake-up latency 218.

The WLAN communication unit 112 can notify the remote control 102 of the duty cycle of the controlled device 104. The remote control 102 can time its transmissions to the controlled device 104 to ensure that the controlled device 104 receives the transmissions from the remote control 102. In some embodiments, the number of retransmission attempts, the retransmission time interval, and/or the command retransmission interval (e.g., number of retransmission attempts per second) may be determined based, at least in part, on the duty cycle of the controlled device 104. For example, if the controlled device 104 has an Xms active interval, the remote control 102 can select the number of retransmission attempts, the retransmission time interval, and/or the retransmission attempts per unit time, such that the command message is transmitted to the controlled device 104 at least once during any Xms time interval.

In some embodiments, the remote control 102 may connect to the controlled device 104 on a first communication channel and may transmit a command message to the controlled device 104 via the first communication channel. The remote control 102 can record an identifier of the first communication channel before transitioning to the sleep operating state or the inactive operating state. However, in some embodiments, the controlled device 104 may switch to a new communication channel while the remote control 102 is in the sleep operating state. For example, the controlled device 104 may associate with an access point of the communication network 100. If the access point switches to the new communication channel during its operation, the controlled device 104 may also switch to the new communication channel to maintain connectivity to the access point. As another example, the controlled device 104 may switch to the new communication channel for peer-to-peer content sharing communication (e.g., Miracast™ communication), in response to detecting a communication channel with a preferred performance (e.g., lower interference level), and/or for initiating another suitable type of communication. Therefore, the remote control 102 may not detect the controlled device 104 on the first communication channel when the remote control 102 transitions to the active operating state. In an effort to locate the controlled device 104, the WLAN communication unit 108 of the remote control 102 can analyze a list of communication channels on which the controlled device 104 is likely to operate, as will be further described below in FIGS. 3 and 4.

Figure 3:
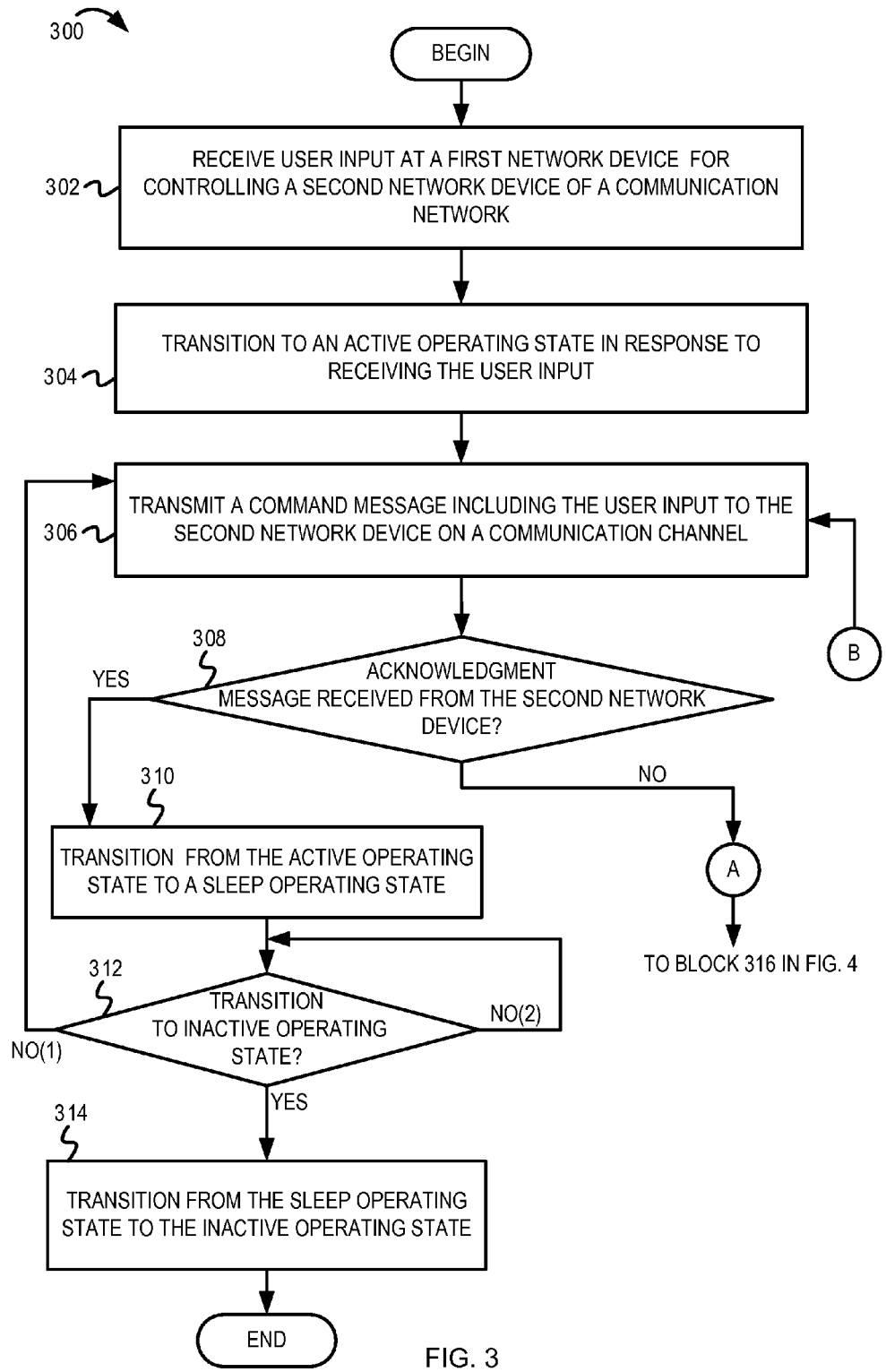
FIG. 3 is a flow diagram illustrating example operations of a WLAN-capable remote control.
Figure 4:
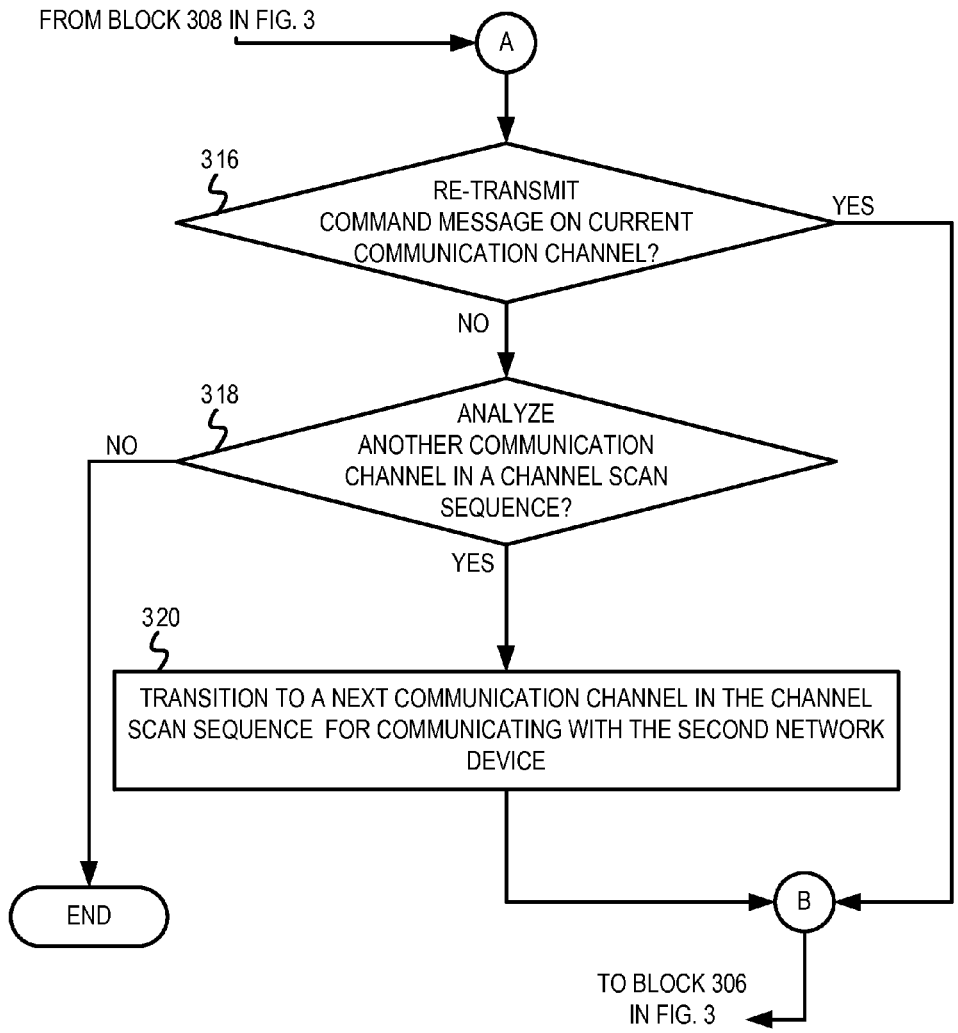
FIG. 4 is a continuation of FIG. 3 and illustrates example operations of a WLAN-capable remote control.

FIG. 3 and FIG. 4 depict a flow diagram ("flow") 300 illustrating example operations of a WLAN-capable remote control. The flow begins at block 302 in FIG. 3.

At block 302, a first network device receives user input to control a second network device of a communication network. With reference to the example of FIG. 1, the input processing unit 110 of the remote control 102 can detect the user input 118. For example, the input processing unit 110 may determine that the user has activated a trigger mechanism (e.g., a physical button, a key press, etc.) of the remote control 102. As another example, the input processing unit 110 may detect a gesture command, a voice command, sensor information, and/or another suitable user input. The flow continues at block 304.

At block 304, the first network device transitions to an active operating state in response to receiving the user input. For example, in response to detecting the user input 118, the power save unit 106 can cause the remote control 102 to operate in the active operating state. As described above in FIG. 2, in the active operating state, the processing and communication components of the remote control 102 may be enabled or operational. The remote control 102 may be configured to transmit and receive communications in the active operating state. In some embodiments, the remote control 102 may transition from an inactive operating state to the active operating state in response to receiving the user input. The inactive operating state can be a deep sleep state, where multiple processing and communication components of the remote control 102 may be partially or fully disabled for maximizing power conservation at the remote control 102. The remote control 102 may not be configured to transmit and receive communications in the inactive operating state. In another embodiment, the remote control 102 may transition from a sleep operating state to the active operating state in response to receiving the user input. The sleep operating state can be an intermediate low-power operating state between the active operating state and the inactive operating state. For example, all the processing components and communication components of the remote control 102 may not be disabled in the sleep operating state. Thus, the response time for transitioning from the sleep operating state to the active operating state may be less than the response time for transitioning from the inactive operating state to the active operating state. The flow continues at block 306.

At block 306, the first network device transmits a command message including the user input to the second network device on a communication channel. For example, the input processing unit 110 of the remote control 102 can generate a command message including the user input. For example, the command message can include an indication of which button was activated. As another example, the command message can include sensor information representative of a gesture user input. As another example, the command message can include voice samples representative of a voice user input. The WLAN communication unit 108 can transmit the command message to the controlled device 104 on a communication channel. The WLAN communication unit 108 may also transmit various other data that are indicative of user input, such as keyboard and mouse events, touchpad data, tracking wheel data, sensor information from a gyroscope/accelerometer, data from a microphone, etc. In some embodiments, the WLAN communication unit 108 can also transmit communication capabilities of the remote control 102. In some embodiments, the WLAN communication unit 108 can transmit a notification indicating a low power level (e.g., low battery level) at the remote control 102. In some embodiments, prior to transitioning to the inactive operating state, the WLAN communication unit 108 may record an identifier of the communication channel on which the remote control 102 last communicated with the controlled device 104. The WLAN communication unit 108 may transmit the command message on this recorded communication channel. In other embodiments, as will be further described below, the WLAN communication unit 108 may scan other communication channels in an attempt to locate the controlled device 104. In this embodiment, the WLAN communication unit 108 can transmit the command message to the controlled device 104 on the communication channel under consideration. The flow continues at block 308.

At block 308, it is determined whether an acknowledgment message is received from the second network device. For example, the WLAN communication unit 108 can determine whether the acknowledgment message is received from the controlled device 104. If the remote control 102 receives the acknowledgment message, this can indicate that the controlled device 104 is configured in the active operating state. The remote control 102 can record the identifier of the communication channel on which the controlled device 104 was detected. If the remote control 102 does not receive the acknowledgment message, this can indicate that the controlled device 104 is configured in the sleep operating state or that the controlled device 104 is operating on another communication channel. If an acknowledgment message is received from the second network device, it is determined that the second network device successfully received the command message and the flow continues at block 310. Otherwise, if the acknowledgment message is not received from the second network device, it is determined that the second network device did not receive the command message and the flow continues at block 316 in FIG. 4.

At block 310, the first network device transitions from the active operating state to a sleep operating state. As described above, the sleep operating state can be an intermediate low-power operating state between the active operating state and the inactive operating state. The remote control 102 may not be configured to transmit/receive communications in the sleep operating state. The remote control 102 may be configured in the sleep operating state to conserve battery power. As described above, the time interval for transitioning from the sleep operating state to the active operating state is less than the time interval for transitioning from the inactive operating state to the active operating state. Therefore, the remote control 102 may be configured in the sleep operating state in anticipation of receiving the next user input. The flow continues at block 312.

At block 312, it is determined whether to transition to the inactive operating state. As described above with reference to FIG. 2, the remote control 102 can remain in the sleep operating state for a predetermined time interval in anticipation of receiving another user input. If the predetermined time interval elapses and the remote control 102 has not detected any user input, the remote control 102 transitions to the inactive operating state and the flow continues at block 314. If the remote control 102 detects a user input before the predetermined time interval elapses, the remote control transitions to the active operating state and the flow continues at block 306 (depicted as the "NO(1)" path in FIG. 3). If the predetermined time interval has not elapsed and if the remote control 102 has not detected any user input, the remote control 102 remains in the sleep operating state and the flow loops back to block 312 (depicted as the "NO(2)" path in FIG. 3).

At block 314, the first network device transitions from the sleep operating state to the inactive operating state. For example, the power save unit 106 can cause the remote control 102 to transition to the inactive operating state. From block 314, the flow ends. The remote control 102 may wait for a next user input while in the inactive operating state.

At block 316 of FIG. 4, the first network device determines whether to retransmit the command message to the second network device on a current communication channel. For example, the WLAN communication unit 108 can determine whether to retransmit the command message to the controlled device 104. To determine whether to retransmit the command message to the controlled device 104 on the current communication channel, the remote control 102 can determine whether a predetermined number of retransmission attempts have elapsed and/or whether a predetermined retransmission time interval has elapsed.

In some embodiments, before retransmitting the command message to the controlled device 104, the remote control 102 may determine whether to transmit a request for operating state feedback ("operating state feedback request") to the controlled device 104. In some embodiments, the WLAN communication unit 108 can transmit a separate message soliciting operating state feedback from the controlled device 104. In other embodiments, the operating state feedback request can be transmitted as part of the command message. By transmitting the operating state feedback request to the controlled device 104, the remote control 102 may request one or more of the following operating state feedback from the controlled device 104: A) a current power state of the controlled device 104 (e.g., whether the controlled device 104 is switched ON/OFF or whether the controlled device is configured in the active operating state or the sleep operating state), B) a current infrastructure mode of the controlled device 104 (e.g., whether the controlled device 104 is associated with an access point of the communication network 100 when the controlled device 104 supports infrastructure mode), C) a current operating communication channel of the controlled device 104, D) a communication channel on which the controlled device 104 is configured to communicate with the associated access point, and/or E) whether the controlled device 104 will operate off-channel for peer-to-peer (P2P) communication. In one embodiment, the operating state feedback request may also include a request information pertaining to the duty cycle of the controlled device 104, the time interval ("presence period") for which the controlled device 104 will remain on the current communication channel, and/or the highest modulation coding scheme (MCS) that the remote control may use for a transmission to the controlled device 104. In determining whether the controlled device 104 will operate off-channel for P2P communication, it may be determined whether P2P communication is enabled or disabled on the controlled device 104. If P2P communication is enabled, the operating state feedback can indicate which P2P channel is currently being used (e.g., currently active) for P2P communication. If P2P communication is disabled, the current operating state can indicate a list of preferred P2P channels that may be used for P2P communication. The list of preferred P2P channels can represent a sequence in which the available P2P channels should be searched to detect the controlled device 104.

In one embodiment, whether the controlled device 104 will operate off-channel for P2P communication may be represented by a Miracast mode of the controlled device 104 (e.g., whether Miracast communication is enabled or disabled on the controlled device 104). In this embodiment, the operating state feedback may include information related to Miracast communication of the controlled device 104. However, in other embodiments, the operating state feedback can include information related to other suitable types of communications performed by the controlled device 104. For example, the operating state feedback can include information associated with other peer-to-peer content sharing communications. In some embodiments, the operating state feedback can indicate a remote control (RC) channel. The RC channel can be a default communication channel for exchanging communications between the remote control 102 and the controlled device 104.

Additionally, the operating state feedback can include a sleep interval and an active interval of the controlled device 104. As described above, the sleep interval can indicate the duration for which the controlled device 104 will be configured in the sleep operating state and unable to transmit/receive communications. The active interval can indicate the duration for which the controlled device 104 will be configured in the active operating state and able to transmit/receive communications. In some embodiments, the operating state feedback can include a preferred list of operating communication channels ("channel scan sequence") associated with the controlled device 104. The operating state feedback may indicate the sequence of the communication channels on which the controlled device 104 is likely to operate. With reference to FIG. 4, if it is determined to retransmit the command message on the current communication channel, the flow continues at block 306 in FIG. 3. Otherwise, if it is determined not to retransmit the command message on the current communication channel, the flow continues at block 318 in FIG. 4.

At block 318, it is determined whether to analyze another communication channel in the channel scan sequence. In some implementations, the WLAN communication unit 108 can determine a sequence in which to scan the communication channels to locate the controlled device 104 ("channel scan sequence") based on a last operating state feedback received from the controlled device 104. For example, the remote control 102 can determine the channel scan sequence based on various factors, such as the association state of the controlled device 104, whether the controlled device 104 will operate off-channel for P2P communication, whether the controlled device 104 is operating on a dynamic frequency selection (DFS) channel, etc. In one specific example, if the controlled device 104 has associated with an access point on a DFS channel, and has disabled Miracast communication, the remote control 102 may determine the channel scan sequence as: RC channel, Miracast channel#1, Miracast channel#2, other 2.4 GHz WLAN communication channels, other 5 GHz WLAN communication channels. In another specific example, if the controlled device 104 is associated with an access point on a non-DFS channel, and enabled Miracast communication, the remote control 102 may determine the channel scan sequence as: Miracast channel#1, non-DFS AP channel, Miracast channel#2, other 2.4 GHz WLAN communication channels, other 5 GHz WLAN communication channels. Although embodiments describe the remote control 102 determining the channel scan sequence based on Miracast communication of the controlled device 104, embodiments are not so limited. In other embodiments, the channel scan sequence can be determined based on other suitable types of communications performed by the controlled device 104.

In some embodiments, the remote control 102 can maintain a channel scan sequence structure. The channel scan sequence structure can include a predetermined channel scan sequence for different operating state feedback of the controlled device 104. In response to receiving the operating state feedback from the controlled device 104, the remote control 102 can compare the received operating state feedback against the channel scan sequence structure and select an appropriate channel scan sequence. With reference to FIG. 4, if the channel scan sequence includes another communication channel to be analyzed, the flow continues at block 320. Otherwise, the flow ends. The remote control 102 may transition to the sleep operating state or the inactive operating state and wait for a next user input.

At block 320, the first network device transitions to the next communication channel in the channel scan sequence for communicating with the second network device. For example, the WLAN communication unit 108 can transition to the next communication channel determined from the channel scan sequence. In some embodiments, the WLAN communication unit 108 may re-transmit the command message to the controlled device 104 on the next communication channel. In another embodiment, the WLAN communication unit 108 may transmit the command message in conjunction with the operating state feedback request. In another embodiment, the remote control 102 may transmit the operating state feedback request after a predetermined number of unsuccessful retransmission attempts of the command message on the current communication channel. In another embodiment, the remote control 102 may not retransmit the command message and may only transmit the operating state feedback request. Operations of the remote control 102 transmitting the command message and/or the operating state feedback request to the controlled device 104 are further described with reference to FIGS. 10 and 11. From block 320, the flow loops back to block 306 in FIG. 3.

As described above with reference to FIGS. 3-4, in some embodiments, the remote control 102 can transmit the operating state feedback request after a predetermined retransmission time interval has elapsed or after a predetermined number of unsuccessful retransmission attempts. For example, after the predetermined number of unsuccessful retransmission attempts and/or after the predetermined retransmission time elapses, the remote control 102 may infer that the controlled device 104 is not active on the current communication channel. Consequently, the remote control 102 can transmit the operating state feedback request to the controlled device 104. In some embodiments, the WLAN communication unit 108 can embed the operating state feedback request in subsequent retransmission attempts of the command message. In some embodiments, as part of the operating state feedback request, the WLAN communication unit 108 can indicate a time interval for which the remote control 102 will remain in the active operating state to receive the operating state feedback. However, in other embodiments, the operating state feedback request may not indicate the time interval for which the remote control 102 will remain in the active operating state. Instead, the remote control 102 may remain in the active operating state until it receives the operating state feedback from the controlled device 104 or until a predefined time interval elapses. In some embodiments, as part of the operating state feedback request, the WLAN communication unit 108 may indicate a communication channel on which the remote control 102 will listen for the operating state feedback. In response to receiving the operating state feedback request, the WLAN communication unit 112 can transmit information about the current operating state of the controlled device 104 to the remote control 102. In one embodiment, the remote control 102 can switch to a next communication channel in the channel scan sequence if the remote control 102 does not receive a response to the command message and/or the operating state feedback request after the predetermined number of retransmission attempts. In another embodiment, the remote control 102 can switch to the next communication channel in the channel scan sequence if the remote control 102 does not receive a response during the predetermined retransmission interval. The remote control 102 can transmit the command message and/or the operating state feedback request on the next communication channel, in an attempt to locate the controlled device 104.

Although FIGS. 3-4 describe the remote control 102 transmitting the operating state feedback request after the predetermined retransmission time interval elapses and/or after the predetermined number of unsuccessful retransmission attempts, embodiments are not so limited. In some embodiments, the remote control 102 may receive the operating state feedback from the controlled device 104 at periodic intervals (without transmitting the operating state feedback request). In some embodiments, the remote control 102 may transmit the operating state feedback request in response to detecting a predetermined type of user input. For example, the operating state feedback request can be linked to activation of a predetermined button on the remote control 102, a predetermined gesture, a predetermined voice command, and/or another suitable user input. In one example, the remote control 102 can transmit the operating state feedback request in response to determining that the user has activated a power ON/OFF button of the remote control 102. As another example, the remote control 102 can transmit the operating state feedback request in response to determining that the user has activated an "enter" or "select" button of the remote control 102. In some embodiments, the remote control 102 can transmit the operating state feedback request if a predetermined time interval has elapsed since the remote control 102 last received the operating state feedback from the controlled device 104. For example, the remote control 102 can initiate a timer in response to receiving operating state feedback from the controlled device 104. If the remote control 102 has not received updated operating state feedback after the timer has elapsed, the remote control 102 can transmit the operating state feedback request to the controlled device 104.

Although not described above with reference to FIGS. 3-4, the input processing unit 110 can maintain a command timer that keeps track of how much time has elapsed after the user input 118 was detected. If the command timer value exceeds a command expiry interval, the remote control 102 can infer that the user input is "stale" and is no longer valid. The command expiry interval can be selected based, at least in part, on a maximum tolerable wake-up latency between a user providing the user input 118 (e.g., pressing a button on the remote control 102) and the controlled device 104 receiving the corresponding command message. If the input processing unit 110 determines that the user input is stale, the WLAN communication unit 108 may discard the command message including the user input. The WLAN communication unit 108 may not retransmit the command message including the user input on any communication channel. In some embodiments, the remote control 102 may continue to transmit the operating state feedback request even after discarding the user input. The remote control 102 may continue to transmit the operating state feedback request until it receives the operating state feedback from the controlled device 104, or a new user input is detected, or the remote control 102 scans all the communication channels in the channel scan sequence once.

Figure 5:
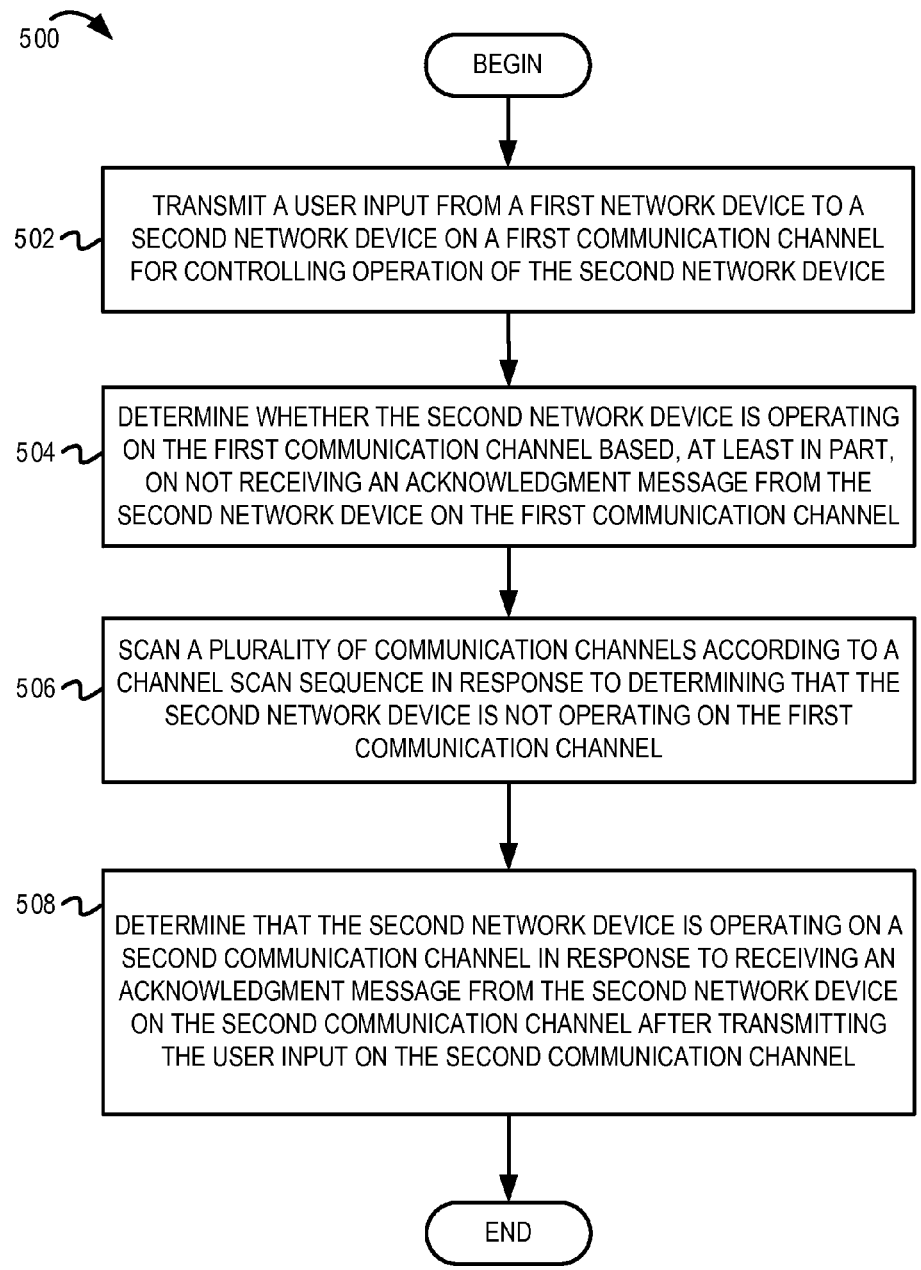
FIG. 5 is a flow diagram illustrating example operations of a remote control for locating a controlled device.

FIG. 5 is a flow diagram illustrating example operations of a remote control for locating a controlled device. The flow continues at block 502.

At block 502, a first network device transmits a user input to a second network device on a first communication channel for controlling operation of the second network device. With reference to the example of FIG. 1, the input processing unit 110 of the remote control 102 can detect the user input 118. For example, the input processing unit 110 may determine that the user has activated a trigger mechanism (e.g., a physical button, a key press, etc.) of the remote control 102. As another example, the input processing unit 110 may detect a gesture command, a voice command, sensor information, and/or another suitable user input. In some embodiments, in response to detecting the user input 118, the power save unit 106 can cause the remote control 102 to transition from an inactive operating state to an active operating state. In another embodiment, in response to detecting the user input 118, the power save unit 106 can cause the remote control 102 to transition from a sleep operating state to the active operating state. As described above with reference to FIG. 3, the input processing unit 110 of the remote control 102 may generate a command message including the user input. The WLAN communication unit 108 can transmit the command message to the controlled device 104 on the first communication channel. In some embodiments, the remote control 102 may be pre-configured to communicate with the controlled device 104 via the first communication channel. In another embodiment, the remote control 102 and the controlled device 104 may negotiate to select the first communication channel for subsequent communications. The flow continues at block 504.

At block 504, the first network device determines whether the second network device is operating on the first communication channel based, at least in part, on not receiving an acknowledgment message from the second network device on the first communication channel. As described above with reference to FIG. 3, the WLAN communication unit 108 of the remote control 102 may determine that the controlled device 104 is not operating on the first communication channel, if the remote control 102 does not receive an acknowledgment message from the controlled device 104. In some embodiments, the remote control 102 may determine that the controlled device 104 is not operating on the first communication channel after a retransmission time elapses and/or a predetermined number of unsuccessful retransmission attempts. In some embodiments as will be further described below, the remote control 102 may determine that the controlled device 104 is not operating on the first communication channel after unsuccessfully attempting to retransmit the user input and/or the operating state feedback request using different communication parameters (e.g., MCS levels). In some embodiments, the remote control 102 may determine that the controlled device 104 is not operating on the first communication channel after a command expiry time elapses or after the channel search period for the first communication channel elapses, as will be described below in FIG. 11. The flow continues at block 506.

At block 506, the first network device scans a plurality of communication channels according to a channel scan sequence in response to determining that the second network device is not operating on the first communication channel. As described above in FIGS. 3 and 4, the remote control 102 may determine the channel scan sequence based, at least in part, on operating state feedback previously received from the second network device. For example, the remote control 102 and the controlled device 104 may have operated on the same communication channel at an earlier time instant. The controlled device 104 may have provided operating state feedback to the remote control 102 at the earlier time instant. In this example, the remote control 102 may store and the operating state feedback and use the channel scan sequence determined from the stored operating state feedback to locate the controlled device 104. The remote control 102 may use the stored operating state feedback received at the earlier time instant until a new operating state feedback is received to replace the stored operating state feedback. At block 506, the remote control 102 has not received new operating state feedback from the controlled device 104. Therefore, the remote control 102 may use the previously received operating state feedback to determine the channel scan sequence to search for the controlled device 104. The remote control 102 may use the channel scan sequence to determine the communication channels on which the controlled device 104 is likely to operate. In response to determining that the controlled device 104 is not operating on the first communication channel, the remote control 102 may switch to a next communication channel indicated in the channel scan sequence. The remote control 102 may retransmit the user input to the controlled device 104 on the next communication channel. As will further be described in FIG. 11, the remote control 102 may successively scan each communication channel listed in the channel scan sequence until the remote control 102 locates the controlled device 104. The flow continues at block 508.

Figure 6:
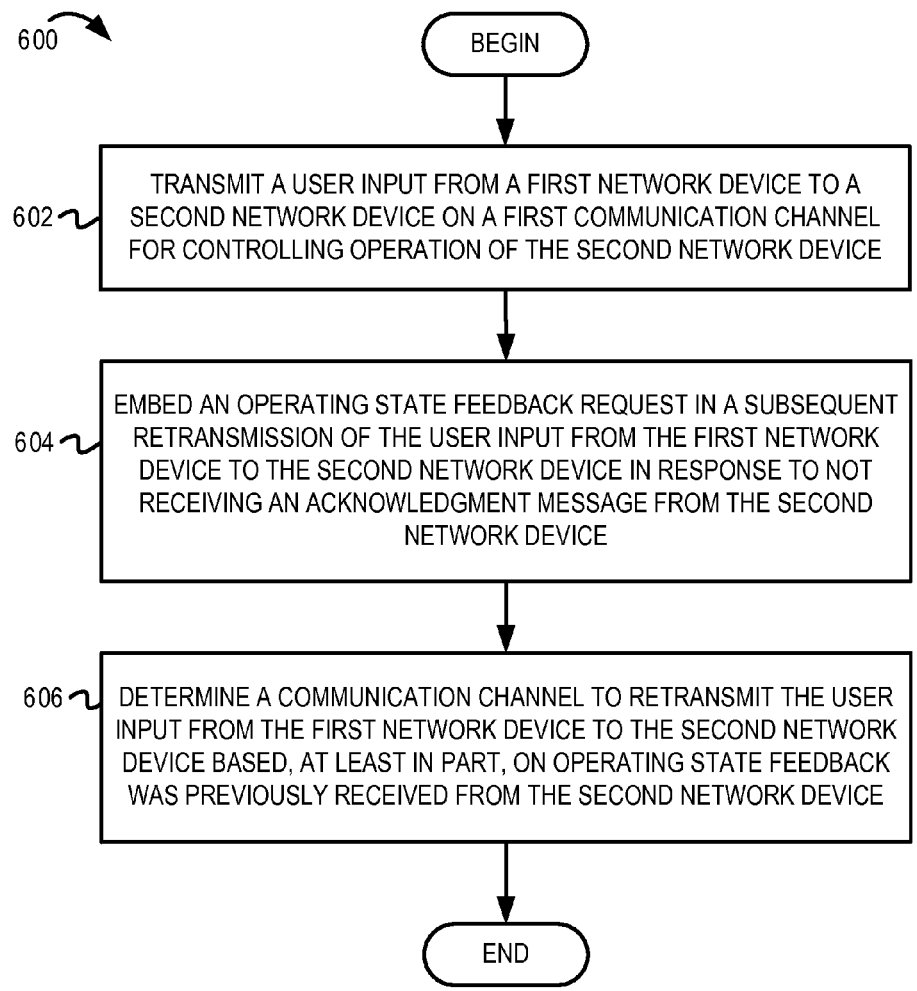
FIG. 6 is a flow diagram illustrating example operations of a remote control for requesting operating state feedback.

At block 508, the first network device determines that the second network device is operating on a second communication channel in response to receiving an acknowledgment message from the second network device on the second communication channel after transmitting the user input on the second communication channel. In some embodiments, the remote control 102 may retransmit the user input on the second communication channel of the channel scan sequence and may receive the acknowledgment message on the second communication channel. The remote control 102 may determine to exchange subsequent communications with the controlled device 104 via the second communication channel. In some embodiments, after receiving the acknowledgment message from the second network device, the power control unit 110 may cause the remote control 102 to transition from the active operating state to an intermediate sleep operating state. As described above, the remote control 102 may remain in the sleep operating state for a predetermined time interval in anticipation of receiving another user input. If the predetermined time interval elapses and the remote control 102 has not detected any user input, the remote control 102 transitions to the inactive operating state. In other embodiments, the remote control 102 may transition from the active operating state to the inactive operating state after successfully transmitting the first user input to the second network device and/or receiving the operating state feedback from the second network device. In this embodiment, the remote control 102 may not operate in the intermediate sleep operating state. From block 508, the flow ends FIG. 6 is a flow diagram illustrating example operations of a remote control for requesting operating state feedback. The flow continues at block 602.

At block 602, a first network device transmits a user input to a second network device for controlling operation of the second network device. With reference to the example of FIG. 1, the input processing unit 110 of the remote control 102 can detect the user input 118. For example, the input processing unit 110 may determine that the user has activated a trigger mechanism (e.g., a physical button, a key press, etc.) of the remote control 102. As another example, the input processing unit 110 may detect a gesture command, a voice command, sensor information, and/or another suitable user input. In some embodiments, in response to detecting the user input 118, the power save unit 106 can cause the remote control 102 to operate in the active operating state.

As described above with reference to FIG. 3, the input processing unit 110 may generate a command message including the user input. The WLAN communication unit 108 can transmit the command message to the controlled device 104 on a communication channel. In some embodiments, the remote control 102 may be pre-configured to communicate with the controlled device 104 via a predefined communication channel. In another embodiment, the remote control 102 and the controlled device 104 may negotiate to select the communication channel for subsequent communications. The flow continues at block 604.

At block 604, an operating state feedback request is embedded in a subsequent retransmission of the user input from the first network device to the second network device in response to not receiving an acknowledgment message from the second network device. As described above with reference to FIG. 3, the remote control 102 may transmit an operating state feedback request to request various types information from the controlled device 104. For example, the remote control 102 may transmit the operating state feedback request to determine a channel scan sequence for locating the controlled device 104. The flow continues at block 606.

At block 606, the first network device determines a first communication channel to retransmit the user input from the first network device to the second network device based, at least in part, on operating state feedback previously received from the second network device. In some embodiments, the remote control 102 can determine the channel scan sequence from the operating state feedback previously received from the controlled device 104. The remote control 102 can retransmit the user input and/or the operating state feedback request on the first communication channel indicated by the channel scan sequence in an attempt to locate the controlled device 104. In some embodiments, if the remote control 102 does not receive the operating state feedback from the controlled device 104 in response to the operating state feedback request, the remote control 102 may retransmit the user input and/or the operating state feedback request on the first communication channel until a predetermined retransmission time interval elapses, the operating state feedback is received, and/or an acknowledgment message is received. The remote control 102 may transmit the user input and/or the operating state feedback request on each communication channel listed in the channel scan sequence until all the communication channels have been scanned or until the controlled device 104 is detected. In some embodiments, the remote control 102 may receive a new operating state feedback from the second network device in response to the operating state feedback request. The remote control 102 may determine a channel scan sequence based, at least in part, on the new operating state feedback. The remote control 102 may determine that the second network device will transition from the first communication channel to a second communication channel based, at least in part, on the channel scan sequence. The remote control 102 can transmit a subsequent user input on the second communication channel. From block 606, the flow ends.

Figure 7:
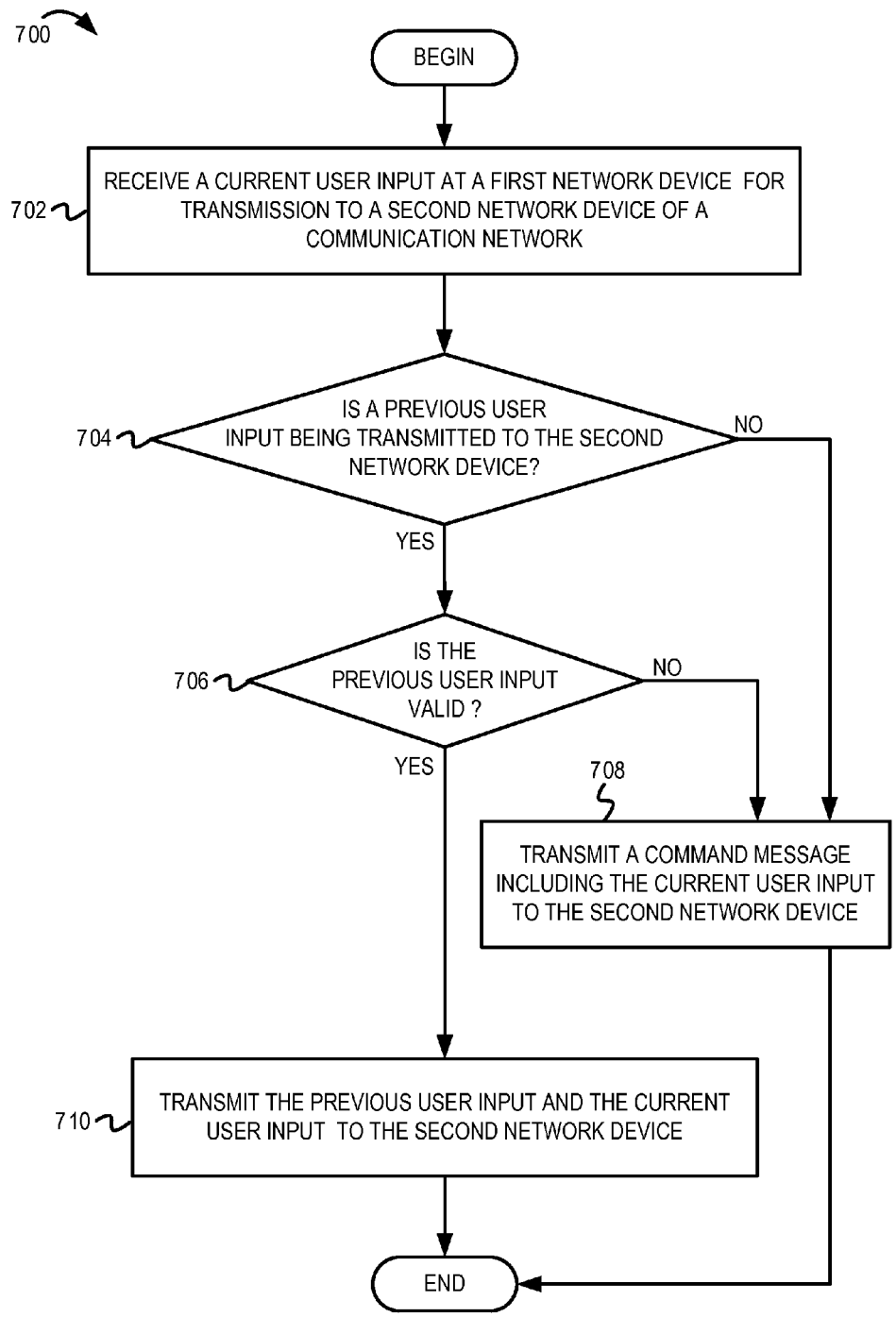
FIG. 7 is a flow diagram of a remote control consolidating multiple user inputs for transmission to a controlled device.

FIG. 7 is a flow diagram 700 of a remote control consolidating multiple user inputs for transmission to a controlled device. The flow begins at block 702.

At block 702, a first network device of a communication network receives a current user input for transmission to a second network device of the communication network. With reference to the example of FIG. 1, the input processing unit 110 of the remote control 102 can detect the user input 118. For example, the input processing unit 110 may determine that the user has activated a trigger mechanism (e.g., a physical button, virtual button, etc.) of the remote control 102. As another example, the input processing unit 110 may detect a gesture user input, a voice user input, sensor information, and/or another suitable user input. As similarly discussed above with reference to block 304 of FIG. 3, the power save unit 106 can cause the remote control 102 to transition from an inactive operating state to an active operating state in response to detecting the current user input. In another example, the power save unit 106 can cause the remote control 102 to transition from a sleep operating state to the active operating state in response to detecting the current user input. The flow continues at block 704.

At block 704, it is determined whether the first network device is transmitting a previous user input to the second network device. For example, the input processing unit 110 can determine whether the WLAN communication unit 108 is currently transmitting the previous user input to the controlled device 104. For example, the user may activate a first button on the remote control 102. While the remote control 102 is transmitting (or retransmitting) an indication of the first button activation, the user may activate a second button on the remote control 102. If the first network device is currently transmitting the previous user input to the second network device, the flow continues at block 706. Otherwise, the flow continues at block 708.

At block 706, it is determined whether the previous user input is valid. For example, the input processing unit 110 can determine whether the previous user input is valid or has timed-out, rendering it invalid. In some embodiments, to determine whether the previous user input is valid, the input processing unit 110 can determine whether a command expiry interval has elapsed after the previous user input was detected at the remote control 102. In another embodiment, the input processing unit 110 can determine whether a predetermined retransmission time interval for transmitting the previous user input has elapsed and/or whether a predetermined number of retransmission attempts have elapsed.

In some embodiments, the input processing unit 110 may compare the previous user input and the current user input to determine whether the previous user input is distinct from the current user input. In some embodiments, if the current user input and the previous user input have the same value (e.g., if the user pressed the same button twice), the input processing unit 110 may consult a predetermined set of rules to determine whether the current user input is a duplicate of the previous user input and whether to transmit one or both of the user inputs. In some embodiments, the input processing unit 110 may determine whether to transmit one or both of the user inputs based, at least in part, on the type of the user input and a context in which the user input was provided. The input processing unit 110 may consult the predetermined set of rules that indicates whether successive identical user inputs should be considered as duplicate or unique user inputs. In one embodiment, the input processing unit 110 may determine whether successive identical user inputs should be considered as duplicate or unique user inputs based on the type of button that is activated. For example, if the power ON/OFF button was successively activated multiple times, the input processing unit 110 may infer that the user intended to press the power ON/OFF button only once. In this example, the input processing unit 110 may infer that a second activation of the power ON/OFF button is a duplicate of a first activation of the power ON/OFF button. As another example, if the volume button was successively activated multiple times, the input processing unit 110 may infer that the user intended to press the volume button multiple times. In this example, the input processing unit 110 may infer that a second activation of the volume button is distinct from a first activation of the volume button. If the previous user input is valid, the flow continues at block 710. Otherwise, the flow continues at block 708.

At block 708, the first network device transmits a command message including the current user input to the second network device. As similarly described above with reference to block 306 of FIG. 3, the input processing unit 110 can generate the command message including the current user input. In some embodiments, the input processing unit 110 can generate the command message including the current user input if the previous user input is not valid but the current user input is valid. As discussed above, the previous user input may not be valid if a command expiry interval has elapsed after the user provided the previous user input, if a predetermined retransmission time interval for transmitting the previous user input has elapsed, if a predetermined number of retransmission attempts have elapsed, etc. In another embodiment, the input processing unit 110 can generate the command message including the current user input if the remote control 102 was not attempting to transmit a previous user input when the current user input was detected. The WLAN communication unit 108 can transmit the command message to the controlled device 104. In some embodiments, as similarly described above with reference to FIGS. 3-4, the remote control 102 may retransmit the command message, switch communication channels to search for the controlled device 104, and/or transmit an operating state feedback request, as needed. From block 708, the flow ends. The remote control 102 may transition to a sleep operating state or an inactive operating state and wait for a next user input.

At block 710, the previous user input and the current user input are transmitted to the second network device. As discussed above, the previous user input may be valid if a command expiry interval has not elapsed after the user provided the previous user input, if a predetermined retransmission time interval for transmitting the previous user input has not elapsed, if a predetermined number of retransmission attempts have not elapsed, etc. Thus, the previous user input may be valid if the remote control 102 was attempting to transmit (or retransmit) the previous user input to the controlled device 104 when the current user input was provided. For example, in response to determining that the previous user input is valid and in response to determining that the previous user input is distinct from the current user input, the remote control 102 can transmit the previous user input and the current user input in a single command message. For example, the previous user input and the current user input may each be in response to the user activating an increase volume button. In this example, the input processing unit 110 may determine (e.g., based on consulting the predetermined set of rules) that successive activation of the "increase volume" button is acceptable. The input processing unit 110 may determine that the user intended to press the increase volume button twice. The input processing unit 110 may infer that the previous user input and the current user input are unique, distinct inputs. The remote control 102 may transmit both the previous user input and the current user input in a common command message. In some embodiments, the remote control 102 may transmit the previous user input and the current user input for a predetermined retransmission time interval and/or for a predetermined number of retransmission attempts before dropping both the user inputs. Thus, if the current user input is provided while the previous user input is valid, the remote control 102 effectively restarts the retransmission time interval for the previous and the current user inputs. In some embodiments, if the current user input is a duplicate of the previous user input, the remote control 102 can restart the retransmission time interval for the previous user input. From block 712, the flow ends.

In some embodiments, the remote control 102 may receive the current user input while the remote control 102 is retransmitting the previous user input and/or soliciting operating state feedback on a communication channel of the channel scan sequence. The remote control 102 may not restart the channel scan procedure and may not re-scan previously scanned communication channels in response to receiving the current user input. Instead, the remote control 102 can continue scanning the remaining communication channels in the channel scan sequence while transmitting the previous user input, the current user input, and/or the operating state feedback request.

Although FIG. 7 describes the remote control 102 determining whether multiple successively received user inputs are unique or duplicates, embodiments are not so limited. Instead, the remote control 102 can transmit each user input to the controlled device 104 in a command message. The input processing unit 114 of the controlled device 104 may analyze the received user inputs to ascertain whether any of the user inputs are duplicates, as similarly described above with reference to the remote control 102. If the controlled device 104 successively receives the same user input multiple times, the input processing unit 114 can determine whether the successively received user inputs are unique or duplicates based on a predetermined set of rules. These rules may be further augmented by the remote control 102 based, at least in part, on relative timing between successive user inputs (e.g., button pushes) detected at the remote control 102. The controlled device 104 can then process the unique user input and discard the duplicate user input.

In some embodiments, the remote control 102 and the controlled device 104 may support multiple user input operating modes. For example, the remote control 102 and the controlled device 104 may support a push-button input operating mode, a gesture input operating mode, a voice input operating mode, a wireless audio input operating mode, or another suitable input operating mode. In some embodiments, the remote control 102 and the controlled device 104 may perform different operations for power conservation, depending on the input operating mode. Operations for implementing a push-button input operating mode will be further described with reference to FIG. 8. Operations for implementing a gesture input operating mode will be further described with reference to FIG. 9.

Figure 8:
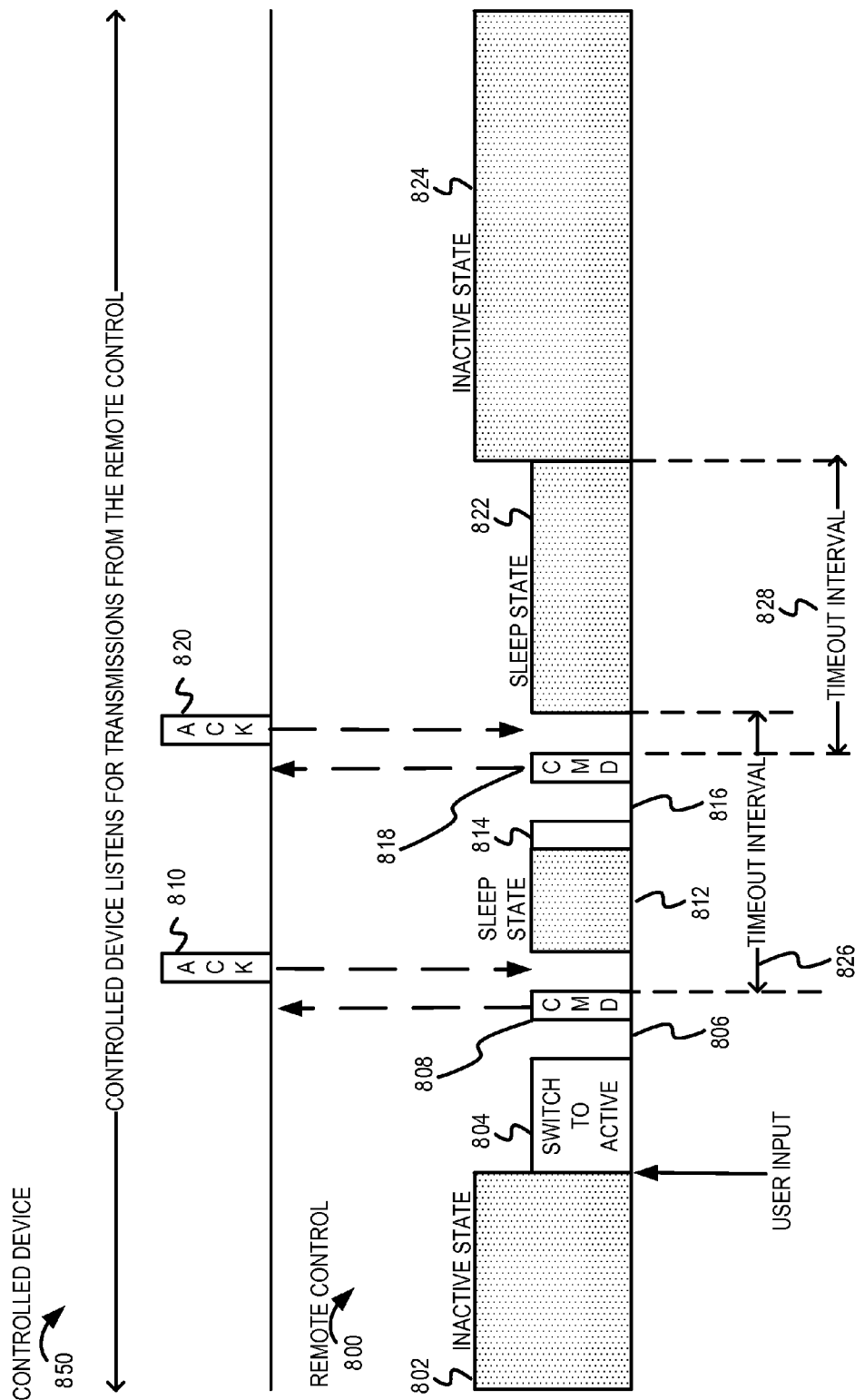
FIG. 8 is a timing diagram illustrating example operations of a WLAN-capable remote control in a push-button input operating mode.

FIG. 8 is a timing diagram illustrating example operations of a WLAN-capable remote control in a push-button input operating mode. In FIG. 8, timing diagram 800 depicts operations of the remote control 102. Timing diagram 850 depicts operations of the controlled device 104 in response to the operations of the remote control 102. Although not depicted in FIG. 8, the controlled device 104 may be switched on and paired with the remote control 102 before the operations of FIG. 8 are executed. While there is no user input, the remote control 102 is configured in an inactive operating state (time interval 802). The remote control 102 transitions to an active operating state when the user activates a button on the remote control 102. The remote control 102 transitions from the inactive operating state to the active operating state during time interval 804. The remote control 102 contends for channel access during time interval 806 according to WLAN communication protocols. The remote control 102 may be configured in the active operating state while contending for channel access during the time interval 806. The remote control 102 generates a command message (CMD) 808 based on the user activating the button of the remote control 102. The remote control 102 transmits the command message 808 to the controlled device 104. The controlled device 104 receives the command message 808 and transmits an acknowledgment message 810 to the remote control 102.

In some embodiments, as depicted in FIG. 8, the remote control 102 may not transition back to the inactive operating state as soon as it receives the acknowledgment message 810 from the controlled device 104. Instead, the remote control 102 may temporarily transition to the sleep operating state in anticipation that the user will activate another button of the remote control 102. As discussed above, the sleep operating state can be an intermediate low-power operating state between the active operating state and the inactive operating state. The response time for transitioning from the sleep operating state to the active operating state may be less than the response time for transitioning from the inactive operating state to the active operating state. In FIG. 8, the inactive operating state and the sleep operating state are depicted using dot-filled blocks. The inactive operating state is depicted using a raised block as compared to the sleep operating state. The remote control 102 may be configured to remain in the sleep operating state for a predetermined timeout interval 826 before transitioning to the inactive operating state. The predetermined timeout interval 826 may be selected by optimizing the amount of power and latency associated with transitioning from the inactive operating state to the active operating state versus the amount of power associated with remaining in the sleep operating state.

In the example of FIG. 8, while the remote control 102 is in the sleep operating state during time interval 812 (within the predetermined timeout interval 826), the user activates a second button on the remote control 102. The remote control 102 transitions from the sleep operating state to the active operating state during time interval 814. For example, during the time interval 814, the remote control 102 may power on or activate processing components and/or communication components of the remote control 102. The remote control 102 contends for channel access during time interval 816 according to WLAN communication protocols. The remote control 102 may be configured in the active operating state while contending for channel access during the time interval 816. The remote control 102 generates a command message 818 based on the user activating the second button of the remote control 102. The remote control 102 transmits the command message 818 to the controlled device 104. The controlled device 104 receives the command message 818 and transmits an acknowledgment message 820 to the remote control 102.

After receiving the acknowledgment message 820, the remote control 102 transitions back to the sleep operating state 822 and initiates another predetermined timeout interval 828. In FIG. 8, the remote control 102 does not receive any user input during the predetermined timeout interval 828. Therefore, after the predetermined time interval 828 elapses, the remote control 102 may infer that the user does not wish to control the controlled device 104. After the predetermined time interval 828 elapses, the remote control 102 transitions from the sleep operating state to the inactive operating state (time interval 824).

Figure 9:
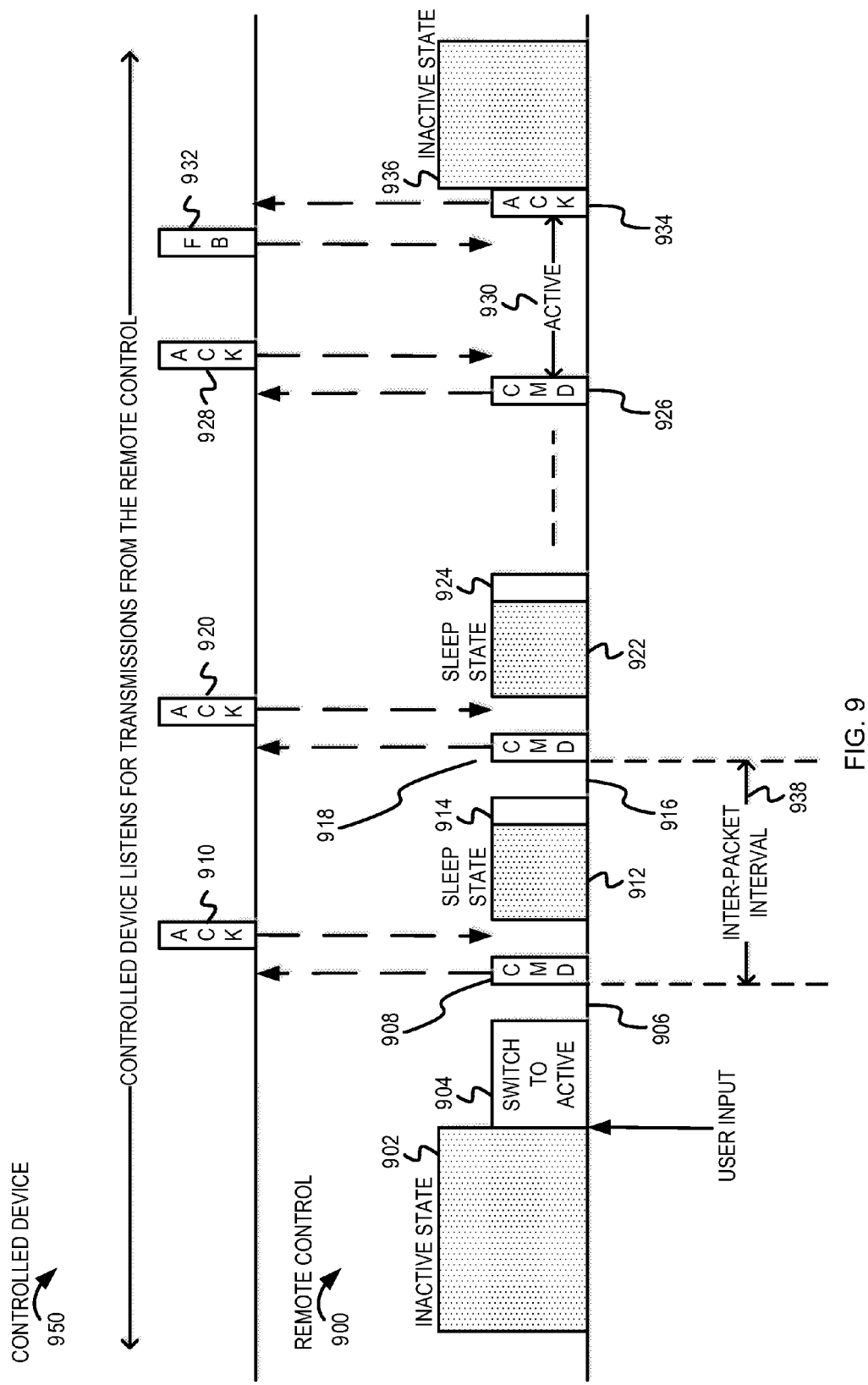
FIG. 9 is a timing diagram illustrating example operations of a WLAN-capable remote control in a gesture input operating mode.

FIG. 9 is a timing diagram illustrating example operations of a WLAN-capable remote control in a gesture input operating mode. In FIG. 9, timing diagram 900 depicts operations of the remote control 102. Timing diagram 950 depicts operations of the controlled device 104 in response to the operations of the remote control 102. Although not depicted in FIG. 9, the controlled device 104 may be switched on and paired with the remote control 102 before the operations of FIG. 9 are executed. While there is no user input, the remote control 102 is configured in an inactive operating state (time interval 902). The remote control 102 detects a user input while the remote control 102 is configured in the inactive operating state. For example, the user may activate a button on the remote control 102 to initiate the gesture input operating mode. As another example, the user input can be sensor information (described below) that is representative of a gesture input. The remote control 102 may transition to an active operating state in response to the remote control 102 detecting the user input. The remote control 102 may transition from the inactive operating state to the active operating state during time interval 904. The remote control 102 contends for channel access during time interval 906 according to WLAN communication protocols. The remote control 102 may be configured in the active operating state while contending for channel access during the time interval 906.

In some embodiments, the remote control 102 may include integrated sensors (e.g., accelerometer, gyroscope, microphone, etc.) to allow the remote control 102 to operate in the gesture input operating mode. In some embodiments, the remote control 102 may receive sensor information from the integrated sensors and may transmit the raw sensor information (without processing) to the controlled device 104 in an effort to conserve battery power on the remote control 102. As depicted in FIG. 9, the remote control 102 generates a command message 908 including the sensor information and transmits the command message 908 to the controlled device 104. The controlled device 104 receives the command message 908 and transmits an acknowledgment message 910 to the remote control 102.

The controlled device 104 may process the sensor information and determine how to respond to the received sensor information. For example, the user may use the remote control 102 as a pointer to select an element displayed on the controlled device 104. The remote control 102 may receive corresponding sensor information from an accelerometer integrated within the remote control 102 and may forward the sensor information to the controlled device 104. The controlled device 104 may process the sensor information and identify the element that the user wishes to select. The controlled device 104 may then present a visual indication of selecting the element.

In the gesture input operating mode, the rate at which the sensor information is generated and transmitted from the remote control 102 is typically higher than the rate at which the user provides the gesture input. The remote control 102 can be configured to transition from the active operating state to the sleep operating state between transmitting successive command messages. For example, as will be further described below in FIG. 9, the remote control 102 may transmit a first command message, transition to the sleep operating state for a predetermined sleep time interval, transition to the active operating state after the predetermined sleep time interval elapses to transmit a second command message, and so on.

Interpretation of the gesture input (e.g., sensor information) is typically performed by the controlled device 104. Therefore, the remote control 102 may periodically transition to the active operating state to receive feedback from the controlled device 104 and to determine whether the user is providing valid gesture input. The remote control 102 may use this received feedback to determine whether the gesture input operating mode is ongoing or whether the user has stopped providing the gesture input (e.g., whether the user has stopped using the remote control 102). The remote control 102 can use the received feedback to determine whether to exit the gesture input operating mode, power down its sensors, and stop transmitting the sensor information to the controlled device 104.

With reference to the example of FIG. 9, the remote control 102 transmits a first command message 908 including a first set of sensor information to the controlled device 104. The remote control 102 receives an acknowledgment message 910 from the controlled device 104. The remote control 102 transitions from the active operating state to the sleep operating state for a sleep time interval 912. As discussed above, the sleep operating state can be an intermediate low-power operating state between the active operating state and the inactive operating state. The transition time and/or power consumption) associated with transitioning from the sleep operating state to the active operating state may be less than the transition time (and/or power consumption) associated with transitioning from the inactive operating state to the active operating state. In FIG. 9, the inactive operating state and the sleep operating state are depicted using dot-filled blocks. The inactive operating state is depicted using a raised block as compared to the sleep operating state. After the sleep time interval 912 elapses, the remote control 102 transitions from the sleep operating state to the active operating state during time interval 914. For example, during the time interval 914, the remote control 102 may power on or activate processing components and/or communication components of the remote control 102. The remote control 102 contends for channel access during time interval 916 according to WLAN communication protocols. The remote control 102 may be configured in the active operating state while contending for channel access during the time interval 916. The remote control 102 generates a second command message 918 including a second set of sensor information and transmits the second command message 918 to the controlled device 104. The time interval between the remote control 102 transmitting the first command message 908 and the second command message 918 is referred to as an inter-packet time interval 938.

The remote control 102 receives an acknowledgment message 920 from the controlled device 104 in response to transmitting the second command message 918. As described above, after receiving the acknowledgment message 920, the remote control 102 transitions from the active operating state to the sleep operating state for a sleep time interval 922. After the sleep time interval 922 elapses, the remote control 102 transitions from the sleep operating state to the active operating state during time interval 924. The remote control 102 then transmits a next command message including the next set of sensor information. More generally, the remote control 102 periodically transmits a command message including a current set of sensor information, transitions to the sleep operating state for a sleep time interval, and transitions to the active operating state to transmit a next set of sensor information. The remote control 102 may ensure that the inter-packet time interval 938 is maintained between transmitting the current set of sensor information and transmitting the next set of sensor information.

Because the remote control 102 is unable to determine whether the user is providing a valid gesture input, the remote control 102 may rely on the controlled device 104 to indicate whether the user is providing the gesture input and whether the remote control 102 should remain in the gesture input operating mode. For example, based on processing the received sensor information, the controlled device 104 can determine whether the user is providing a valid gesture input or whether the user has stopped using the remote control 102. In some embodiments, the remote control 102 can indicate (as part of the command message including the sensor information) when and for how long the remote control 102 will remain in the active operating state to receive gesture feedback from the controlled device 104. The gesture feedback can indicate whether the remote control 102 should remain in the gesture input operating mode or whether the remote control 102 should transition to the inactive operating state. With reference to the example of FIG. 9, the remote control 102 can transmit a command message 926 including the next set of sensor information and a gesture feedback request. In some embodiments, the gesture feedback request can indicate for how long the remote control 102 will remain in the active operating state. However, in other embodiments, the gesture feedback request may not indicate for how long the remote control 102 will remain in the active operating state. In this embodiment, the remote control 102 may remain in the active operating state until it receives the gesture feedback from the controlled device 104 or until a predefined time interval elapses. The controlled device 104 receives the command message 926 including the gesture feedback request and transmits an acknowledgment message 928. In response to receiving the acknowledgment message 928, the remote control 102 remains in the active operating state (during time interval 930) in anticipation of receiving the gesture feedback from the controlled device 104. The controlled device 104 can transmit the gesture feedback 932 (FB) during the time interval 930 specified by the remote control 102. The gesture feedback can indicate whether the remote control 102 should remain in the gesture input operating mode and whether the remote control 102 should continue to periodically transmit sensor information to the controlled device 104.

The remote control 102 can transmit an acknowledgment message 934 to the controlled device 104 in response to receiving the gesture feedback 932. The remote control 102 can analyze the gesture feedback and determine whether to remain in the gesture input operating mode. In the example of FIG. 9, based on the received gesture feedback 932, the remote control 102 determines that the user is no longer providing gesture input. Accordingly, after transmitting the acknowledgment message 934, the remote control 102 transitions to the inactive operating state (time interval 936).

In some embodiments, as described above with reference to FIG. 9, the remote control 102 can transmit the gesture feedback request and remain in the active operating state after a predetermined number of command messages (and sensor information) are transmitted. In another embodiment, after each command message (i.e., after each set of sensor information) is transmitted to the controlled device 104, the remote control 102 may remain in the active operating state for a predetermined time interval in anticipation of receiving the gesture feedback from the controlled device 104.

Although FIG. 9 describes the remote control 102 transmitting the gesture feedback request and indicating when the controlled device 104 should transmit the gesture feedback, embodiments are not so limited. In some embodiments, the controlled device 104 may have a priori knowledge of when and for how long the remote control 102 will remain in the active operating state to receive the gesture feedback. In this embodiment, the remote control 102 may not transmit the gesture feedback request to the controlled device 104. Instead, the controlled device 104 may automatically transmit the gesture feedback to the remote control 102 at predetermined periodic time intervals. In another embodiment, the controlled device 104 may not transmit the gesture feedback at periodic intervals. Instead, when the controlled device 104 determines that the user has stopped using the remote control 102, the controlled device 104 can indicate (e.g., in an acknowledgment message) that the remote control 102 should exit the gesture input operating mode. In another embodiment, the controlled device 104 may indicate when the controlled device 104 will transmit the gesture feedback to the remote control 102. Furthermore, in addition to indicating whether the remote control 102 should remain in the gesture input operating mode, the controlled device 104 can also indicate how often the remote control 102 should transmit the sensor information to the controlled device 104 and how often the remote control 102 should listen for gesture feedback from the controlled device 104. In some embodiments, the gesture feedback can also include operating state feedback of the controlled device 104, previously described above.

As discussed above, the time interval over which the user provides the gesture input may encompass transmission of multiple sets of sensor information. The controlled device 104 may infer the gesture input based on evaluating the multiple sets of sensor information. Therefore, in some embodiments, there may be little or no difference between consecutive sets of sensor information. Each set of sensor information may be represented in terms of bits, symbols, samples, or another suitable unit of information. In some embodiments, the remote control 102 can be configured to conserve power by only transmitting substantially unique sensor information to the controlled device 104. For example, the remote control 102 may transmit a first command message including a first set of sensor information. After receiving a second set of sensor information, the remote control 102 may determine whether the second set of sensor information is substantially different from the first set of sensor information. For example, the remote control 102 may determine whether the difference between the first set of sensor information and the second set of sensor information is less than a sensor threshold. As another example, the remote control 102 may determine whether the difference between a first set of data samples that correspond to the first set of sensor information and a second set of data samples that correspond to the second set of sensor information is less than the sensor threshold. As another example, the remote control 102 may determine whether the correlation between the first set of sensor information and the second set of sensor information exceeds a correlation threshold. If the difference is less than the sensor threshold or if the correlation exceeds the correlation threshold, the remote control 102 can determine that the second set of sensor information is approximately the same as the first set of sensor information. Accordingly, the remote control 102 may not transmit the second set of sensor information to the controlled device 104. However, if the difference between the first set of sensor information and the second set of sensor information is greater than or equal to the sensor threshold or if the correlation does not exceed the correlation threshold, the remote control 102 may transmit the second set of sensor information to the controlled device 104. Thus, the remote control 102 can minimize the number of transmissions and the amount of sensor information transmitted in the gesture input operating mode.

In some embodiments, the input processing unit 116 of the controlled device 104 (e.g., a gesture processing application) may be configured to receive the sensor information periodically once the gesture input operating mode is initiated. The input processing unit 116 may interpret the sensor information and present the resultant output (e.g., selecting an element, moving a mouse pointer, etc.) on a display unit of the controlled device 104. The input processing unit 116 may generate an error message if the sensor information is not received at the appropriate time instant. As discussed above, if the second set of sensor information is approximately the same as the first set of sensor information, the remote control 102 may not transmit the second set of sensor information. If the WLAN communication unit 112 of the controlled device 104 does not receive current sensor information from the remote control 102, the WLAN communication unit 112 can infer that the current sensor information is approximately the same as previous sensor information. Consequently, for error-free operation of the input processing unit 116, the WLAN communication unit 112 can provide the previous sensor information for a second time to the input processing unit 116. In some embodiments, the WLAN communication unit 112 can generate the current sensor information by adding a predetermined level of comfort noise to the previous sensor information. This can ensure that the input processing unit 116 receives the current sensor information that is different from the previous sensor information.

WLAN communication protocols typically indicate various modulation and coding scheme (MCS) levels that indicate how a WLAN-capable network device can transmit communications to another WLAN-capable network device. Each MCS level represents a different tradeoff between throughput and reliability. Typically, a higher throughput level (e.g., higher data transmission rate) is associated with a lower reliability level and vice versa. In response to determining to transmit a command message to the controlled device 104, the remote control 102 can select an initial MCS level that minimizes energy consumption and maximizes throughput of the remote control 102. The initial MCS level can be selected based on the operating state feedback from the controlled device 104, received signal strength information (RSSI) of the remote control 102 (provided by the controlled device 104), and/or other suitable factors. Alternately, the initial MCS used by the remote control 102 may be selected based on input from the controlled device 104.

After a predetermined number of unsuccessful retransmission attempts, the remote control 102 can select a second MCS level that optimizes transmission reliability. The remote control 102 can attempt to retransmit the command message to the controlled device 104 using the second MCS level. In some embodiments, if retransmitting the command message at the second MCS level is unsuccessful, the remote control 102 can select a third MCS level to retransmit the command message. In other embodiments, if retransmitting the command message at the second MCS level is unsuccessful for a predetermined retransmission interval or for a predetermined number of retransmission attempts, the remote control 102 can switch to a next communication channel (from the channel scan sequence) and attempt to locate the controlled device 104 on the next communication channel, as described above with reference to FIGS. 3-4. Operations for retransmitting the command message at different MCS levels are further illustrated in FIG. 10.

Figure 10:
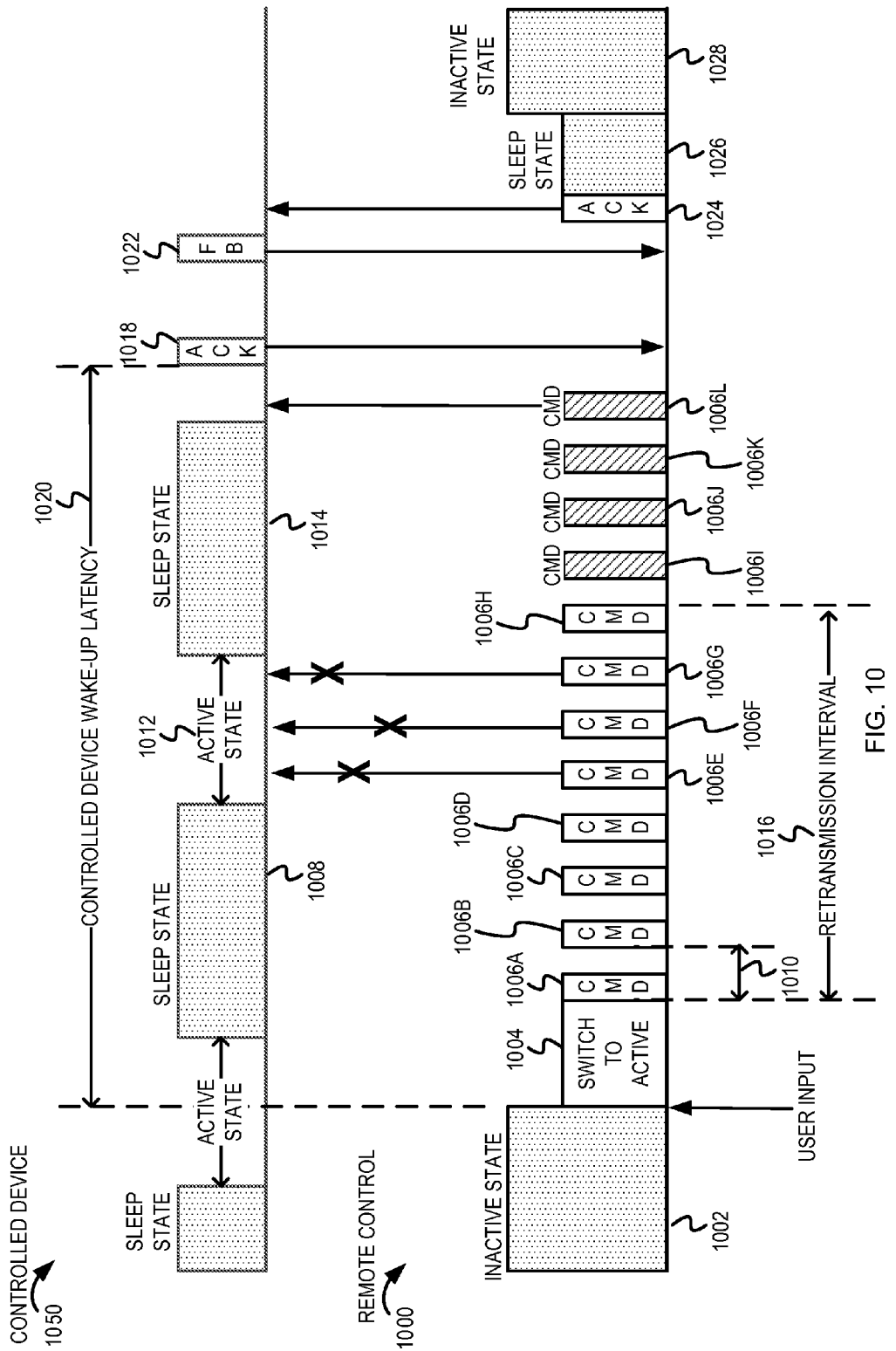
FIG. 10 is a timing diagram illustrating example operations of a WLAN-capable remote control for varying transmission parameters to communicate with a controlled device.

FIG. 10 is a timing diagram illustrating example operations of a WLAN-capable remote control varying transmission parameters to communicate with a controlled device. In FIG. 10, timing diagram 1000 depicts operations of the remote control 102 and timing diagram 1050 depicts operations of the controlled device 104. While there is no user input, the remote control 102 is configured in an inactive operating state (time interval 1002). In response to detecting a user input, the remote control 102 transitions from the inactive operating state to the active operating state, during time interval 1004. The remote control 102 may transition to the active operating state in response to any suitable user input, such as activation of any virtual/physical button of the remote control, a voice command, a gesture command, etc.

The input processing unit 110 of the remote control 102 generates a command message (CMD) 1006A in response to detecting the user input at the remote control 102. The WLAN communication unit 108 of the remote control 102 transmits the command message 1006A to the controlled device 104. However, as depicted in the timing diagram 1050, the controlled device 104 periodically transitions between the sleep operating state and the active operating state. In the example of FIG. 10, the controlled device 104 is configured in the sleep operating state during sleep interval 1008, when the remote control 102 transmits the command message 1006A. Therefore, the controlled device 104 does not receive the command message 1006A and does not transmit a corresponding acknowledgment message. If the remote control 102 does not receive the acknowledgment message within a predetermined acknowledgment time interval, the WLAN communication unit 108 can retransmit the command message at a predetermined command repetition interval 1010.

As depicted in FIG. 10, the remote control 102 retransmits command messages 1006B, 1006C, and 1006D to the controlled device 104, while the controlled device 104 is configured in the sleep operating state (during the sleep interval 1008). After the sleep interval 1008 elapses, the controlled device 104 transitions to the active operating state for active interval 1012. The remote control 102 continues to retransmit the command message 1006E, 1006F, and 1006G while the controlled device 104 is configured in the active operating state during the active interval 1012. The remote control 102 transmits the command message 1006H while the controlled device 104 is configured in the sleep operating state during the next sleep interval 1014. However, in some implementations, the controlled device 104 does not receive and acknowledge any of the messages 1006E, 1006F, 1006G, and 1006H. In FIG. 10, the messages 1006A-1006H are transmitted using a first MCS level. In some implementations, the command messages 1006E, 1006F, and 1006G that are transmitted during the active interval 1012 may not be successfully received by the controlled device 104 (depicted using an "X") if the controlled device 104 cannot reliably receive messages that use the first MCS level. After a predetermined retransmission time interval 1016 elapses (or after a predetermined number of unsuccessful retransmission attempts), the remote control 102 selects a second MCS level (as described above) and begins to retransmit the user input using the second MCS level in command messages 1006I, 1006J, 1006K, and 1006L. The messages 1006I-1006L transmitted using the second MCS level may also include an embedded operating state feedback request. In FIG. 10, the messages 1006I-1006L that are transmitted using the second MCS level and that include the operating state feedback request are depicted using hatched lines.

In the example of FIG. 10, the remote control 102 transmits the command messages 1006I, 1006J, and 1006K while the controlled device 104 is configured in the sleep operating state during the sleep interval 1014. After the sleep interval 1014 elapses, the controlled device 104 transitions to the active operating state. The remote control 102 transmits the command message 1006L while the controlled device 104 is configured in the active operating state. The controlled device 104 receives the retransmitted command message 1006L and transmits an acknowledgment message 1018 to the remote control 102. As discussed above, the time interval between the remote control 102 detecting the user input and the controlled device 104 receiving and acknowledging the user input is the wake-up latency 1020.

Because the command message 1006L included an operating state feedback request, the controlled device 104 transmits operating state feedback (FB) 1022 to the remote control 102. In the example of FIG. 10, the controlled device 104 transmits the operating state feedback 1022 to the remote control 102 after transmitting the acknowledgment message 1018. In response to receiving the acknowledgment message 1018, the remote control 102 remains in the active operating state to receive the operating state feedback 1022 from the controlled device 104. However, in other embodiments, the controlled device 104 may transmit the operating state feedback as part of the acknowledgment message 1018. After receiving the operating state feedback 1022, the remote control 102 transmits acknowledgment message 1024 to the controlled device 104. The remote control 102 transitions from the active operating state to the sleep operating state for a sleep interval 1026. As discussed above, the remote control 102 transitions from the sleep operating state to the inactive operating state after the sleep interval 1026 elapses. The remote control 102 may remain in the inactive operating state (depicted as time interval 1028) until the remote control 102 detects another user input. In some embodiments, as will be further described in FIG. 11, the remote control 102 may vary both the MCS level and the communication channel to locate the controlled device 104.

In some embodiments, the controlled device 104 may receive and acknowledge one of the command messages 1006E, 1006F, and 1006G that were transmitted using the first MCS level. In this embodiment, the remote control 102 may transmit subsequent messages (e.g., an operating state feedback request message, a second command message, etc.) using the first MCS level. The remote control 102 may not switch to the second MCS level if the controlled device 104 can successfully receive messages using the first MCS level.

Figure 11:
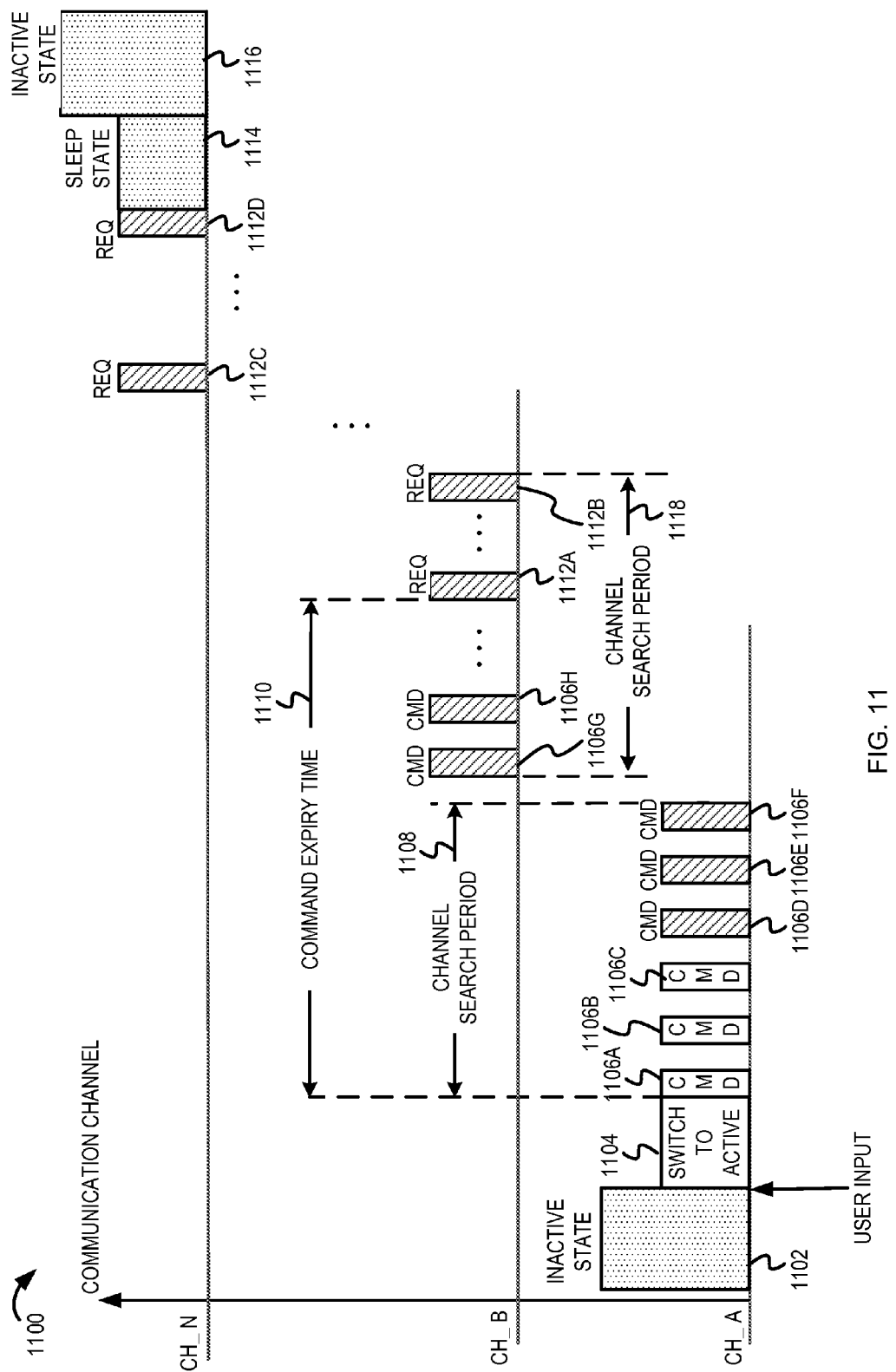
FIG. 11 is a timing diagram illustrating example operations of a remote control for identifying an operating communication channel of the controlled device.

FIG. 11 is a timing diagram 1100 illustrating example operations of a remote control for identifying an operating communication channel of the controlled device. FIG. 11 depicts a graph of WLAN communication channel versus time. While there is no user input, the remote control 102 is configured in the inactive operating state (time interval 1102). In response to detecting a user input, the remote control 102 transitions from the inactive operating state to the active operating state, during time interval 1104.

The input processing unit 110 of the remote control 102 generates a command message 1106A in response to detecting the user input at the remote control 102. The WLAN communication unit 108 of the remote control 102 transmits the command message (CMD) 1106A to the controlled device 104. However, the controlled device 104 may not receive the command message if, for example, the controlled device 104 is operating on a different communication channel, is configured in a sleep operating state, etc. In the example of FIG. 11, the controlled device 104 does not receive the command message 1106A and does not transmit a corresponding acknowledgment message. If the WLAN communication unit 108 does not receive the acknowledgment message within a predetermined acknowledgment time interval, the WLAN communication unit 108 can retransmit the command message using other suitable transmission parameters (e.g., a different MCS level, a different communication channel, etc.), as will be further described below. In FIG. 11, the remote control 102 transmits the original command message 1106A and retransmitted messages 1106B and 1106C using a first MCS level and via a first communication channel (depicted as CH_A). After a predetermined retransmission time interval elapses or after a predetermined number of unsuccessful retransmission attempts, the remote control 102 selects a second MCS level and retransmits the command message on the first communication channel using the second MCS level. In the example of FIG. 11, the remote control 102 transmits command messages 1106D, 1106E, and 1106F on the first communication channel using the second MCS level. In some embodiments, the command messages 1106D, 1106E, and 1106F may also include an embedded operating state feedback request. In FIG. 11, the command messages 1106D, 1106E, and 1106F transmitted using the second MCS level are depicted using hatched lines.

After a predetermined channel search period 1108 elapses, the remote control 102 selects a next communication channel. The channel search period 1108 can refer to a time interval for which the remote control 102 attempts to locate the controlled device 104 on a particular communication channel. The channel search period 1108 may be determined based, at least in part, on an active interval and a sleep interval of the controlled device 104. The next communication channel may be determined based, at least in part, on the channel scan sequence (described above in FIGS. 3-4). In FIG. 11, after the channel search period 1108 for the first communication channel elapses, the remote control 102 retransmits the command message via a second WLAN communication channel (depicted as CH_B). The remote control 102 transmits command messages 1106G, 1106H, etc. via the second communication channel. In some embodiments, as depicted in FIG. 11, the remote control 102 may transmit the command messages 1106G, 1106H using the second MCS level. However, in other embodiments, the remote control 102 may transmit some command messages on the second communication channel using the first MCS level and may transmit the remaining command messages on the second communication channel using the second MCS level, as described above. In yet another embodiment, the remote control 102 may transmit some command messages on the second communication channel using the second MCS level, may transmit the remaining command messages on the second communication channel using a third MCS level, and so on.

In the example of FIG. 11, after a predetermined command expiry time 1110 elapses, the remote control 102 determines that the user input is "stale" and is no longer valid. Therefore, after the command expiry time 1110 elapses, the remote control 102 stops retransmitting the user input to the controlled device 104. Instead, as depicted in FIG. 11, the remote control 102 only transmits an operating state feedback request (REQ) 1112A to the controlled device 104. The remote control 102 may retransmit the operating state feedback request on the second communication channel multiple times (depicted by messages 1112A . . . 1112B). After the channel search period 1118 for the second communication channel elapses, the remote control 102 can switch to a third communication channel and retransmit the operating state feedback request until the remote control 102 receives the operating state feedback from the controlled device 104 or until the channel search period for the third communication channel elapses. The channel search period for each of the communication channels may be different or may be the same.

In the example of FIG. 11, the remote control 102 transmits operating state feedback requests 1112C and 1112D on the $n^{th}$ communication channel (depicted at CH_N). After the channel search period for the $n^{th}$ communication channel elapses, the remote control 102 determines that it has scanned all the communication channels on which the controlled device 104 is likely to operate. For example, the remote control 102 may determine that it has scanned all the communication channels indicated in the channel scan sequence. Accordingly, after unsuccessfully transmitting the operating state feedback request 1112D and after the channel search period for the $n^{th}$ communication channel elapses, the remote control 102 can transition from the active operating state to the sleep operating state. The remote control 102 can remain in the sleep operating state for a sleep interval 1114. As discussed above, the remote control 102 transitions from the sleep operating state to the inactive operating state after the sleep interval 1114 elapses. The remote control 102 may remain in the inactive operating state (depicted as time interval 1116) until the remote control 102 detects another user input. In an alternate embodiment, the remote control 102, may transition to an inactive state of operation 1116 responsive to transmitting frame 1112D.

Figure 12:
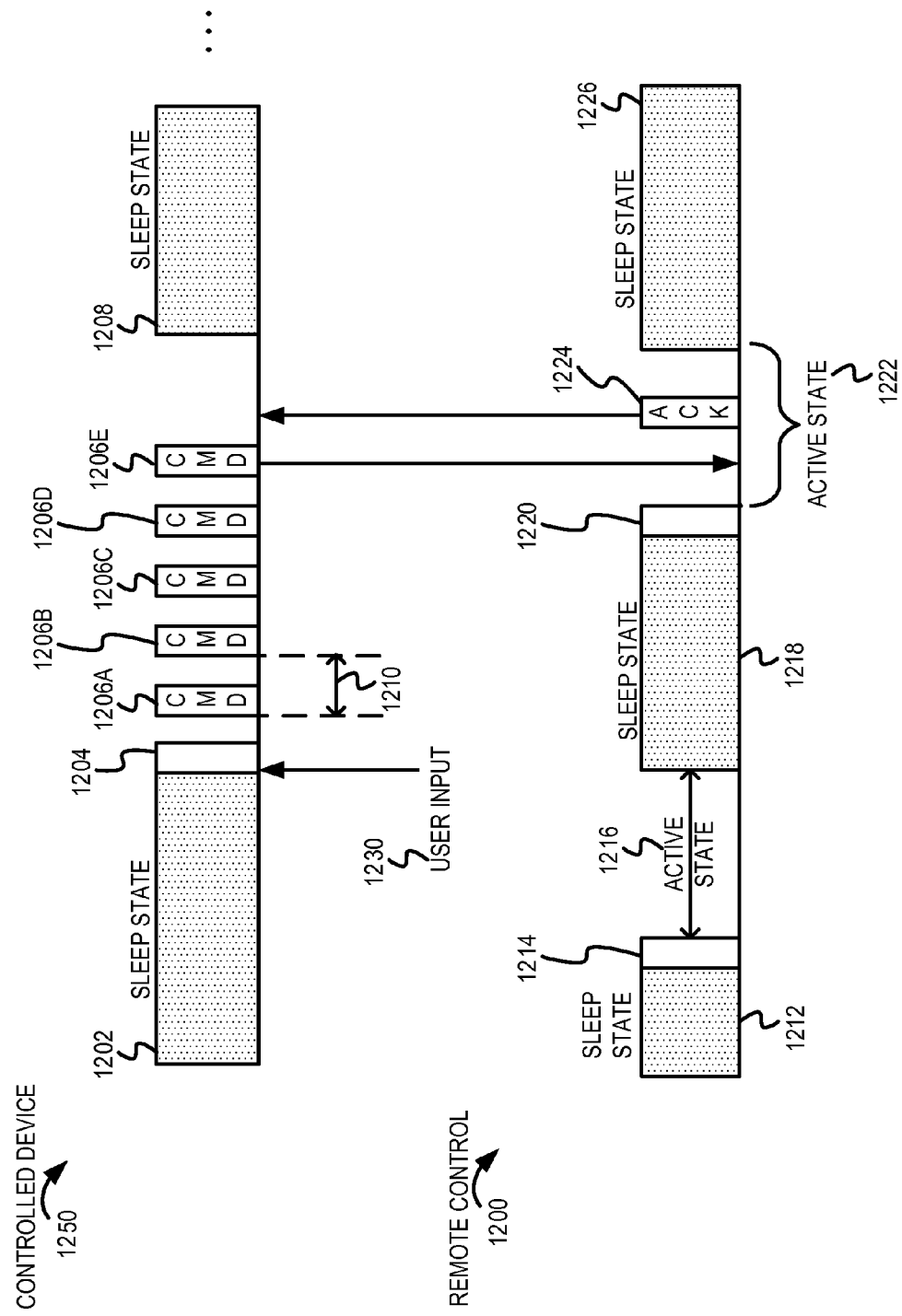
FIG. 12 is a timing diagram illustrating example operations of a controlled device for detecting a remote control.

FIG. 12 is a timing diagram illustrating example operations of a controlled device for detecting a remote control. In FIG. 12, timing diagram 1200 depicts operations of the remote control 102 and timing diagram 1250 depicts operations of the controlled device 104. The remote control 102 periodically transitions between the sleep operating state and the active operating state. Likewise, the controlled device 104 periodically transitions between the sleep operating state and the active operating state. As depicted in the timing diagram 1250, the controlled device 104 is configured in the sleep operating state during a sleep interval 1202. While configured in the sleep operating state, a user provides an input 1230 prompting the controlled device 104 to locate the remote control 102. For example, the user may activate a "find remote control" button on the controlled device 104. In response to the user input 1230, the controlled device 104 transitions from the sleep operating state to the active operating state during time interval 1204. For example, during the time interval 1204, the controlled device 102 may power on or activate processing components and/or communication components of the controlled device 104. The controlled device 104 generates a command message (CMD) 1206A including a request that the remote control 102 should indicate its presence to the user.

The controlled device 104 transmits the command message 1206A to the remote control 102. For example, the controlled device 104 may transmit the command message 1206A on the communication channel that was last used for communicating with the remote control 102. However, as depicted in the timing diagram 1200, the remote control 102 periodically transitions between the sleep operating state and the active operating state. For example, the remote control 102 is configured in the sleep operating state during sleep interval 1212, transitions from the sleep operating state to the active operating state during time interval 1214, and operates in the active operating state during active interval 1216. After the active interval 1216 elapses, the remote control 102 transitions to the sleep operating state for a sleep interval 1218. The controlled device 104 attempts to transmit the command message 1206A and retransmitted messages 1206B, 1206C, and 1206D to the remote control 102, while the remote control 102 is configured in the sleep operating state (during sleep interval 1218). As discussed above, the controlled device 104 may retransmit the command message every predetermined command repetition interval 1210. After the sleep interval 1218 elapses, the remote control 102 transitions from the sleep operating state to the active operating state during time interval 1220, and operates in the active operating state during active interval 1222. The controlled device's transmission of the command message 1206E falls within the active interval 1222 of the remote control 102. The remote control 102 receives the command message 1206E and transmits an acknowledgment message 1224 to the controlled device 104. In addition, the remote control 102 can also indicate its presence to the user to allow the user to locate the remote control 102. For example, the remote control 102 can activate a light source (e.g., LED) integrated within the remote control 102, provide haptic feedback (e.g., vibrate the remote control 102), provide audio feedback, etc. After the active interval 1222 elapses, the remote control 102 can transition to the sleep operating state for a sleep interval 1226. Likewise, after receiving the acknowledgment message 1224 from the remote control 102, the controlled device 104 can transition to the sleep operating state for a sleep interval 1208.

Figure 13:
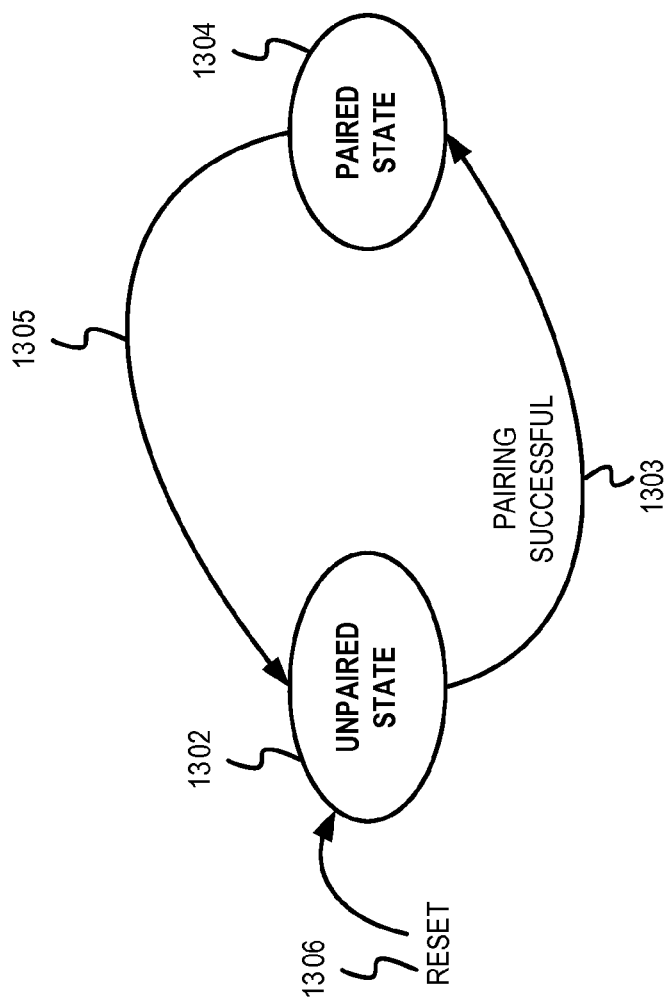
FIG. 13 is a state diagram illustrating example operations performed by a remote control.
Figure 14:
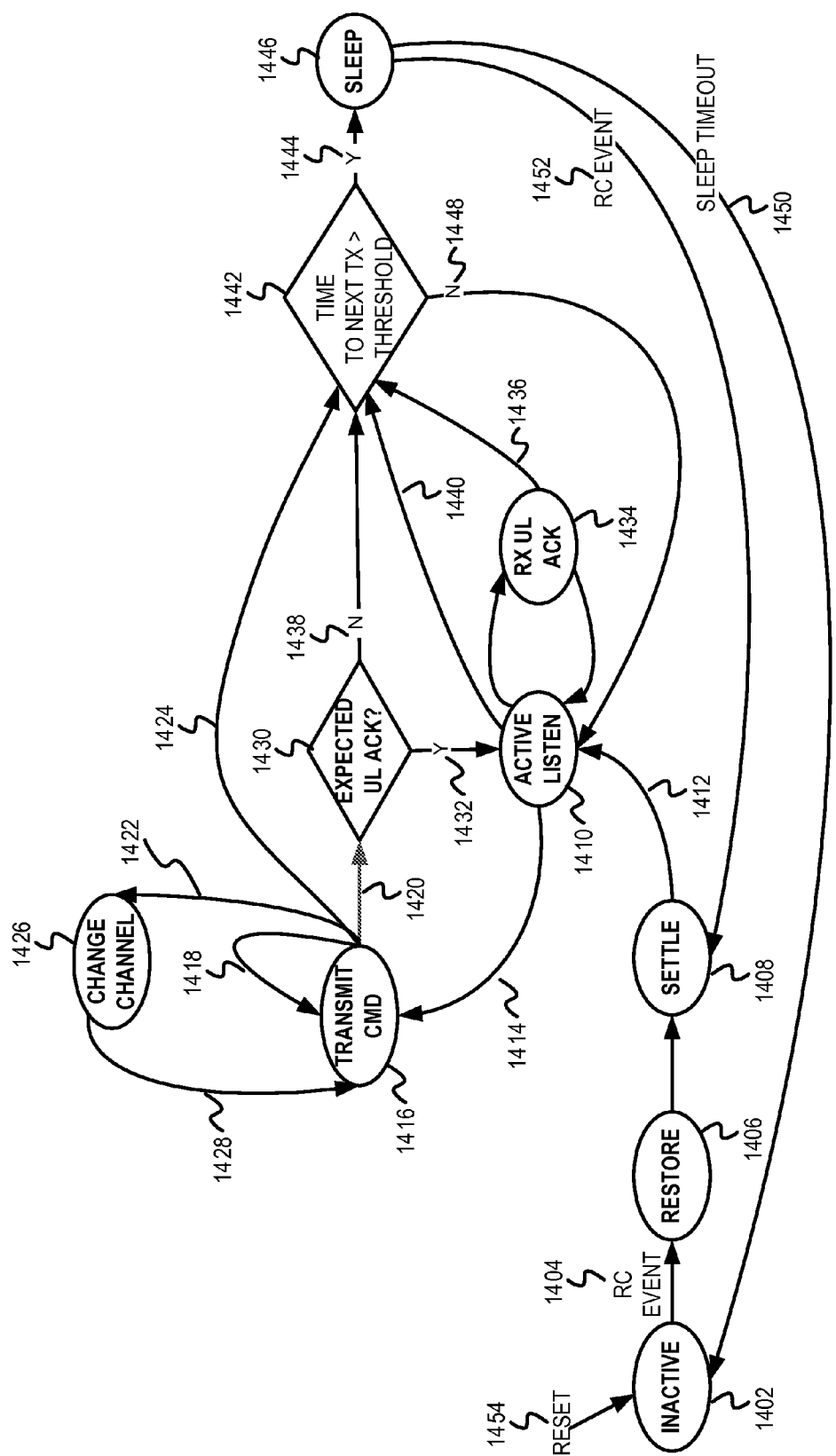
FIG. 14 is a state diagram illustrating example power state operations of a remote control.
Figure 15:
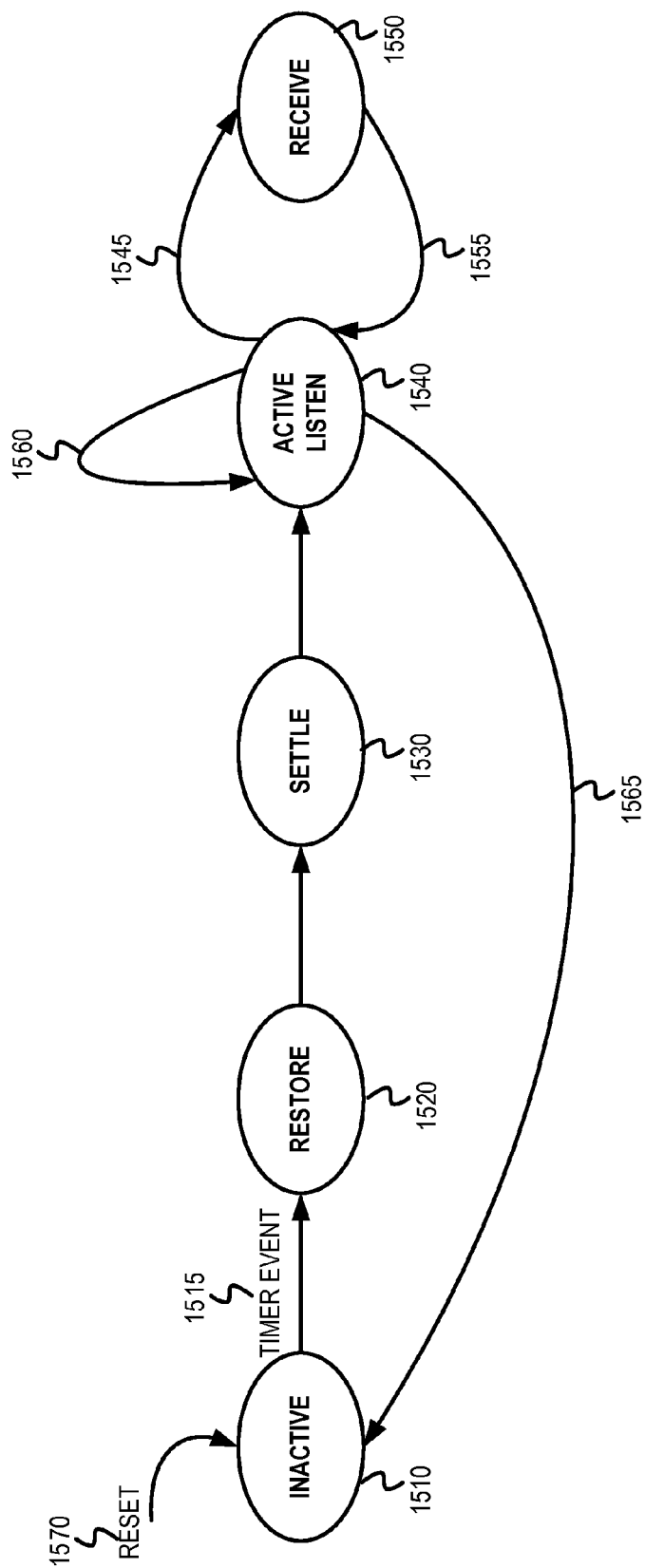
FIG. 15 is a state diagram illustrating example power state operations of a controlled device.

FIGS. 13-15 are state diagrams that describe various example states and operations in accordance with various embodiments of this disclosure. The state diagrams are non-limiting examples of various operating states, transitions, or conditions which might be implemented on a remote control or controlled device. It should be understood that the state diagrams would be implemented as a state machine, instructions embodied on machine-readable media, hardware, software, or the like. In some embodiments, an apparatus may include one or more processors executing instructions configured to implement the states, transitions, or conditions described in FIGS. 13-15.

FIG. 13 is a state diagram illustrating example operations performed by a remote control (e.g., remote control 102). The remote control may begin in an unpaired state 1302 of operation. The remote control may transition (depicted by transition 1303) to a paired state 1304 of operation after a pairing process between the remote control and a controlled device is successfully completed. If the remote control locally determines that pairing has been lost with the controlled device, the remote control may transition (depicted by transition 1305) to the unpaired state 1302 of operation. In some embodiments, the remote control may transition (depicted by transition 1305) to the unpaired state 1302 responsive to a suitable user-input. Alternatively, the remote control may transition to the unpaired state after the remote control unsuccessfully attempts to locate the controlled device on the communication channels indicated in the channel scan sequence as described above. Furthermore, the remote control may operate in the unpaired state 1302 of operation when the remote control is reset or restarted (depicted by transition 1306).

FIG. 14 is a state diagram illustrating example power state operations of a remote control (e.g., remote control 102). The remote control may execute the operations described in FIG. 14 when the remote control is operating in a paired state of operation. The remote control may start in an inactive operating state 1402. In response to receiving a remote control (RC) event 1404, such as a button press, the remote control may transition to a restore operating state 1406 and a settle operating state 1408. After the settling state 1408, the remote control may transition to an active listen operating state 1410 (depicted by transition 1412). If a command is available to transmit the remote control may attempt to transmit (depicted by transition 1414) the command to the controlled device in state 1416. The remote control may remain in the state 1416 (depicted by loop 1418) to transmit the command until the remote control receives a layer-2 acknowledgment message from the controlled device (depicted by transition 1420) or the channel search time interval elapses (depicted by transition 1422) or the time interval for transmitting the command elapses (depicted by transition 1424).

If the channel search time interval elapses 1422, the remote control can switch to a next communication channel on the channel scan list and start to operate on the next communication channel (state 1426). The remote control can then attempt to retransmit the command on the next communication channel, as depicted by transition 1428 from state 1426 to state 1416.

In response to receiving the layer-2 acknowledgment message 1420, the remote control can determine whether the remote control expects to receive an upper-layer acknowledgment message (state 1430). If the remote control expects to receive the upper-layer acknowledgment (see transition 1432), then the remote control can transition to the active listen operating state 1410 and remain in the active listen operating state 1410 until the upper-layer acknowledgment message (UL_ACK) is received in state 1434, or a new command is available to transmit (see transition 1414), or a maximum upper-layer latency time interval elapses (see transition 1440 to state 1442). At state 1434, if the upper-layer acknowledgment message is received, the remote control may estimate the remaining time before the next command is scheduled to be transmitted (see transition 1436 from state 1434 to state 1442).

If the remote control is not scheduled to receive an upper-layer acknowledgment message (transition 1438 from state 1430) or if the time interval for receiving the upper-layer acknowledgment message has elapsed (transition 1440), the remote control estimates the remaining time before the next command is scheduled to be transmitted. At state 1442, the remote control compares the remaining time with a predetermined threshold. If the remaining time before the next command is transmitted is greater than the pre-determined threshold, the remote control transitions to sleep operating state 1446 via transition 1444. However, if the remaining time before the next command is transmitted is greater than the pre-determined threshold, the remote control transitions to else it returns to the active listen operating state 1410, via transition 1448.

After a sleep timeout interval elapses, the remote control transitions from the sleep operating state 1446 to the inactive operating state 1402, depicted by transition 1450. The transition from the sleep operating state 1446 to the inactive operating state 1402 may also be referred to as a transition to "suspend" operations of the remote control. If the remote control detects a new RC event (e.g., a button press) before the sleep timeout interval elapses, the remote control transitions from the sleep operating state 1446 to the settle operating state 1408, depicted by transition 1452. Furthermore, the remote control may operate in the inactive operating state 1402 when the remote control is reset or restarted (depicted by transition 1454).

FIG. 15 is a state diagram illustrating example power state operations of a controlled device (e.g., controlled device 104). In some embodiments, while in a standby mode of operation, the WLAN module of the controlled device may oscillate between an intermediate sleep operating state and an active operating state. The controlled device may transition between the sleep operating state and the active operating state to reduce standby power consumption of the controlled device while maintaining responsiveness to commands transmitted from the remote control.

The controlled device may start from an inactive operating state 1510. Furthermore, the controlled device may operate in the inactive operating state 1510 when the controlled device is reset or restarted (depicted by transition 1570). In response to detecting a periodic timer event 1515 (e.g., in response to completion of a sleep cycle), the controlled device may transition through a restore operating state 1520 and a settling operating state 1530. The controlled device may then transition to an active listen operating state 1540. The controlled device may remain in the active listen operating state 1540 for a predetermined time interval (e.g., an RC presence time interval) during which the controlled device waits to detect packets. If a packet is detected, the controlled device may transition (depicted by transition 1545) to a receive operating state 1550. After receiving the packet, the controlled device transitions from the receive operating state 1550 to the active listen operating state 1540 (depicted by transition 1555) and determines the next operating state based, at least in part, on the received packet.

If the next operating state is the active listen operating state, the controlled device may cancel the predetermined time interval (e.g., the RC presence time interval) and may remain in the active listen operating state 1540, depicted by transition 1560. In the active listen operating state 1540, the controlled device may continue to wait to detect subsequent commands/messages from the remote control.

However, if the controlled device does not receive an indication to remain in the active listen operating state 1540, the controlled device may operate in the active listen operating state 1540 (as a standby mode of operation) until the predetermined time interval (e.g., the RC presence time interval) elapses. After the RC presence time interval elapses, the controlled device may transition to the inactive operating state 1510 via transition 1565.

It should be understood that FIGS. 1-15 are examples meant to aid in understanding embodiments and should not be used to limit embodiments or limit scope of the claims. Embodiments may comprise additional components, different components, and/or may perform additional operations, fewer operations, operations in a different order, operations in parallel, and some operations differently. For example, in a voice input operating mode, the remote control 102 and the controlled device 104 can execute similar operations as described above in FIG. 9 for the gesture input operating mode. The remote control 102 can periodically transmit a command message including voice samples to the controlled device 104. The controlled device 104 can process the voice samples and present an appropriate output. Furthermore, the controlled device 104 can provide feedback to the remote control 102 indicating whether the user is providing voice input and whether the remote control 102 should remain in the voice input operating mode. Furthermore, the remote control 102 may also determine whether a current set of voice samples is approximately the same as a previous set of voice samples (e.g., when the user is not speaking) and whether to provide the current set of voice samples to the controlled device 104.

The Figures describe that the remote control 102 and the controlled device 104 transmit and receive messages. However, in other embodiments, the remote control 102 and the controlled 104 may transmit and receive packets, frames, and/or other suitable units of data. The packet, frame, and/or another suitable unit of data may include a header field, a payload field, and/or other suitable number and type of fields. FIGS. 1-15 refer to the remote control 102 and/or the controlled device 104 connecting to each other or to other network devices. The term "connect" may refer to a physical connection between the network devices or a communicative coupling between the network devices (e.g., using wired or wireless communication media and protocols). Additionally, the term "connect" may refer to a direct coupling between the network devices or an indirect coupling between the network devices via one or more intermediate network devices.

Although the Figures describe the controlled device 104 transmitting the operating state feedback to the remote control 102 in response to receiving the operating state feedback request, embodiments are not so limited. In some embodiments, in response to receiving the operating state feedback request, the controlled device 104 can determine whether a current operating state feedback is the same as the last transmitted operating state feedback. If so, the controlled device 104 may not transmit the current operating state feedback to the remote control 102. Instead, the controlled device 104 may transmit an acknowledgment message to the remote control 102 to indicate that the current operating state feedback is the same as the last transmitted operating state feedback. In other embodiments, the controlled device 104 may transmit another suitable message or a suitable value within a message to indicate that the current operating state feedback is the same as the last transmitted operating state feedback. The controlled device 104 may transmit the current operating state feedback if the current operating state feedback is different from the last transmitted operating state feedback.

In some embodiments, the remote control 102 may not detect the controlled device 104 after scanning all the communication channels indicated in the channel scan sequence. For example, the remote control 102 may not detect the controlled device 104, if the controlled device 104 has been unplugged, if the remote control 102 is outside the communication range of the controlled device 104, etc. Accordingly, remote control 102 can notify the user that the remote control 102 is unable to detect the controlled device 104 and that the user should re-execute pairing operations between the remote control 102 and the controlled device 104. In other embodiments, the remote control 102 can notify the user that the remote control 102 is unable to detect the controlled device 104 after a predetermined number of consecutive user inputs could not be successfully transmitted to the controlled device 104. The remote control 102 can notify the user that it has lost pairing with the controlled device 104 by activating a light source (e.g., LED) integrated within the remote control 102, providing haptic feedback (e.g., vibrating the remote control 102), providing audio feedback, presenting a notification on a display unit of the remote control 102, etc.

In some embodiments, the remote control 102 may implement functionality to indicate whether the remote control 102 is on the verge of losing connectivity to the controlled device 104. In one embodiment, the remote control 102 can monitor the performance measurement (e.g., RSSI, error rate, etc.) of a wireless communication link between the remote control 102 and the controlled device 104. The remote control 102 can compare the performance measurement against a performance threshold to determine whether the performance measurement is in accordance with the performance threshold. For example, the remote control 102 can determine whether the performance measurement is greater/less than the performance threshold. As another example, the remote control 102 can determine whether the performance measurement is within a predetermined percentage or predetermined range of the performance threshold. Based on comparing the performance measurement with the threshold, the remote control 102 can determine whether to present a link status indicator regarding the wireless communication link. The link status indicator may indicate that the remote control 102 is on the edge of a WLAN coverage range of the controlled device 104. In other words, the link status indicator can indicate, to the user, that the remote control 102 is on the verge of losing connectivity to the controlled device 104. For example, the remote control 102 can present the link status indicator if the RSSI is less than an RSSI threshold. As another example, the remote control 102 can present the link status indicator if the error rate is greater than an error rate threshold. As another example, the remote control 102 can present the link status indicator if the RSSI is lower than the threshold RSSI by 5% (or another suitable percentage) of the threshold RSSI. In some embodiments, the link status indicator may be a notification that is presented on a display unit associated with the remote control 102. In another embodiment, the remote control 102 may present the link status indicator by blinking a light source (e.g., a light emitting diode or LED), providing haptic feedback (e.g., vibrate), provide audio feedback, and/ or providing other suitable feedback to indicate that the remote control 102 will lose connectivity to the controlled device 104. A user may move the remote control 102 within the WLAN coverage range of the controlled device 104 in response to receiving the link status indicator.

In some embodiments, the remote control 102 may transmit the user input to the controlled device 104 if the remote control 102 will not lose connectivity to the controlled device 104. In some embodiments, the remote control 102 may transmit the user input to the controlled device 104 after presenting the link status indicator that that the remote control 102 will lose connectivity to the controlled device 104. In other embodiments, the remote control 102 may transmit the user input to the controlled device 104 after ensuring that the remote control 102 is within the WLAN coverage range and will not lose connectivity to the controlled device 104. In this embodiment, the remote control 102 may not transmit the user input to the controlled device 104 until it is determined that the remote control 102 will not lose connectivity to the controlled device 104.

In some embodiments, the controlled device 104 may determine whether the remote control 102 is on the verge of losing connectivity to the controlled device 104. The controlled device 104 can monitor the performance measurement of the communication link between the remote control 102 and the controlled device 104. When appropriate, the controlled device 104 can provide a notification (e.g., via the controlled device, via the remote control 102, etc.) to indicate that the remote control 102 is on the verge of losing connectivity to the controlled device 104. In some embodiments, if the remote control 102 connects to the controlled device 104 via an intermediate network device, the remote control 102, the controlled device 104, and/or the intermediate network device can monitor the performance measurement of the communication link between the remote control 102 and the intermediate network device. As described above, if the performance measurement of the communication link between the remote control 102 and the intermediate network device is not in accordance with the performance threshold, the remote control 102, the controlled device 104, and/or the intermediate network device can provide a notification that the remote control 102 is on edge of a WLAN coverage range of the intermediate network device. The notification may be provided by activating a light source (e.g., LED), providing haptic feedback, providing audio feedback, presenting a notification on a display unit, etc. In response to receiving the notification that the remote control 102 is on the verge of losing connectivity to the controlled device 104 (or the intermediate network device), the user can move the remote control 102 closer to the controlled device 104 (or the intermediate network device).

In some embodiments, the controlled device 104 may switch to and communicate on a dynamic frequency selection (DFS) channel. For example, the controlled device 104 may connect to an access point or network gateway (not shown in FIG. 1) of the communication network 100. If the access point switches to the DFS channel, the controlled device 104 may also switch to the DFS channel to maintain connectivity to the access point. A DFS channel can be a communication channel that may be used for WLAN communications only if network devices implementing other communication protocols (e.g., RADAR communications) are not active on the DFS channel. Typically, a WLAN-capable network device may be required to wait for a significant amount of time to ensure that the DFS channel is available for WLAN communication before communicating via the DFS channel. Therefore, because of power and latency considerations, the remote control 102 may not be configured to operate on the DFS channel. Accordingly, if the controlled device 104 operates on the DFS channel, the controlled device 104 can be configured to periodically switch to a non-DFS channel to enable the remote control 102 to detect and communicate with the controlled device 104. In some embodiments, the controlled device 104 can periodically switch to and maintain a presence on a non-DFS channel for a predetermined time interval. The predetermined time interval can be selected based, at least in part, on the active interval of the controlled device 104. For example, the controlled device 104 may indicate (to the remote control 102) that it has a 5 ms active interval during each 100 ms time interval. Accordingly, if the controlled device 104 is configured to operate on the DFS channel, the controlled device 104 can be configured to switch to the non-DFS channel for at least 5 ms during each 100 ms time interval. However, in other embodiments, the controlled device 104 can maintain any suitable active interval and sleep interval. Furthermore, if configured to operate on the DFS channel, the controlled device 104 can maintain a presence in an active operating state on the non-DFS channel for any suitable time interval. In one example, as described above, the controlled device 104 can switch to the non-DFS channel for a predetermined time interval that is equal to the active interval. In one embodiment, the non-DFS channel can be a communication channel previously negotiated between the remote control 102 and the controlled device 104. In another embodiment, the non-DFS channel can be any suitable communication channel (e.g., a Miracast communication channel, a 2.4 GHz WLAN communication channel, a 5 GHz WLAN communication channel, etc.) from the channel scan sequence.

In some embodiments, the controlled device 104 may associate with and connect to another network device in the communication network 100. For example, the controlled device 104 may associate with and connect to a laptop computer, a smart appliance, or another suitable network device. Prior to exchanging messages with the network device, the controlled device 104 and the network device may negotiate to select a suitable communication channel for subsequent communications. The controlled device 104 may not include the DFS channels while negotiating with the network device for selecting a communication channel.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
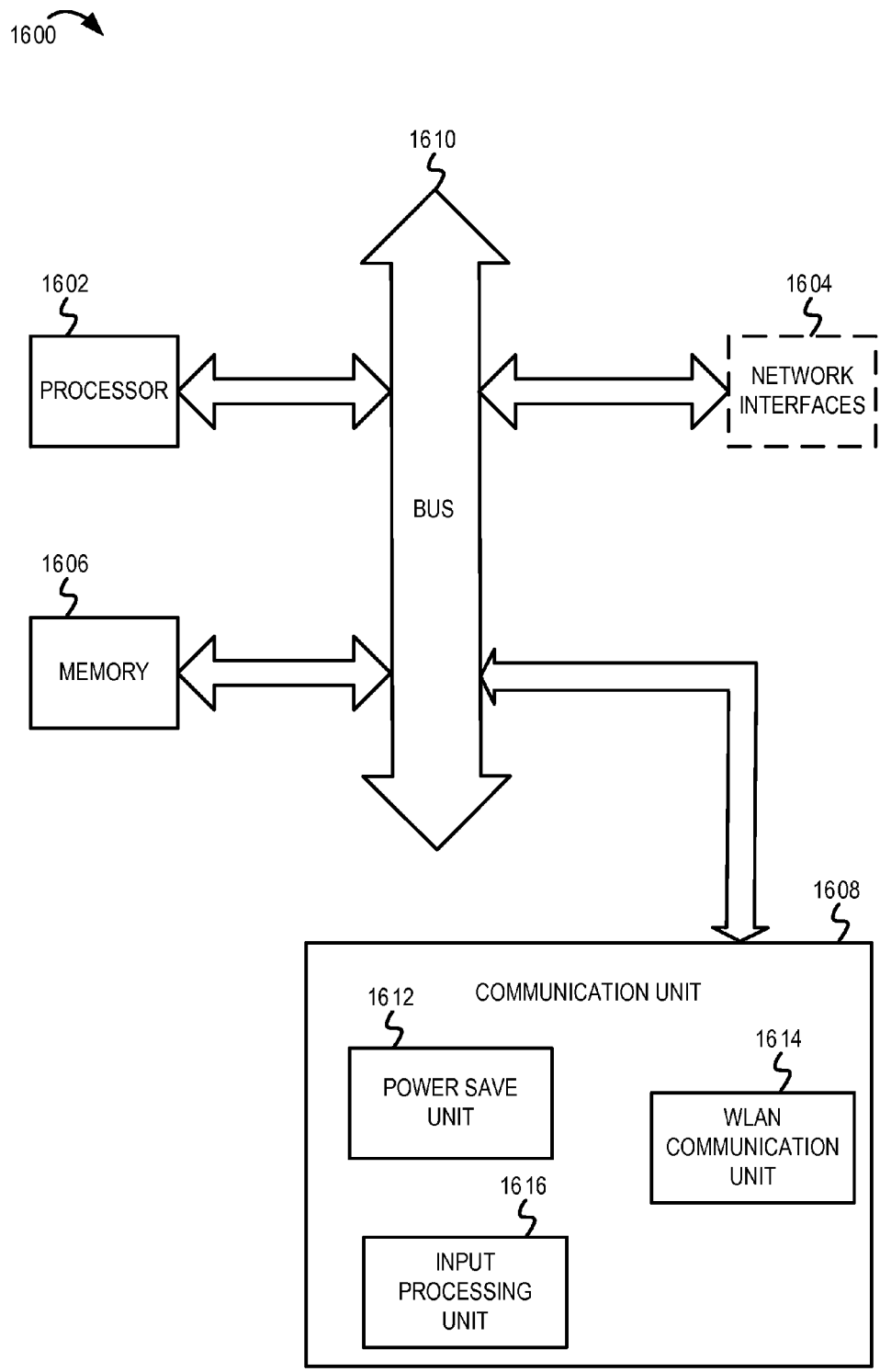
FIG. 16 is a block diagram of an example electronic device including a mechanism for power conservation in a communication network.

FIG. 16 is a block diagram of one embodiment of an electronic device 1600 including a mechanism for power conservation in a communication network. In some implementations, the electronic device 1600 may be one of a desktop computer, a laptop computer, a tablet computer, a mobile phone, a smart appliance, a gaming console, a television, a set top box, an audio player, a media player, or another electronic device comprising a communication unit that can be controlled by a remote control or another controlling device. In another implementation, the electronic device 1600 may be a remote control or another electronic device configured to receive user input for controlling a network device. The electronic device 1600 includes a processor 1602 (possibly including multiple processors, multiple cores, multiple nodes, and/or implementing multi-threading, etc.) and a memory 1606. The memory 1606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable storage media. The electronic device 1600 also includes a bus 1610 (e.g., PCI, ISA, PCI-Express, HyperTransport®, InfiniBand®, NuBus, AHB, AXI, etc.). The electronic device 1600 may optionally include a network interface 1604 (depicted using dashed lines). For example, the electronic device 1600 may include the network interface 1604 if the electronic device can be controlled by a remote control. The network interface 1604 may include a wireless network interface (e.g., a WLAN interface, a Bluetooth® interface, a WiMAX interface, a ZigBee® interface, a Wireless USB interface, etc.) and/or a wired network interface (e.g., a PLC interface, an Ethernet interface, etc.). In some embodiments, the electronic device 1600 may execute IEEE 802.11 protocols for implementing WLAN communication functionality. In some embodiments, the electronic device 1600 may execute IEEE 1905.1 protocols for implementing hybrid communication functionality.

The electronic device 1600 also includes a communication unit 1608. The communication unit 1608 includes a power save unit 1612, a WLAN communication unit 1614, and an input processing unit 1616. In one embodiment, as described above with reference to FIGS. 1-12 and 15, the power save unit 1612 can cause the electronic device 1600 to periodically transition between an active operating state and a sleep operating state. In response to receiving user input from the remote control, the input processing unit 1616 can process the user input and determine how to render the resultant output on a display unit of the electronic device 1600. In another embodiment, as described above in FIGS. 1-11 and 13-14, the input processing unit 1616 can receive the user input, determine whether to transmit the user input to the network device, and cause the WLAN communication unit 1614 to transmit the user input to the network device. The power save unit 1612 can determine whether to configure the electronic device 1600 in an active operating state, an intermediate sleep operating state, or an inactive operating state based, at least in part, on communications from the input processing unit 1616 and the controlled network device. In some embodiments, the communication unit 1608 may also include at least one wireless interface for communicating with and controlling the operation of the controlled network device.

Any one of these functionalities may be partially (or entirely) implemented in hardware and/or on the processor 1602. For example, the functionality may be implemented with an application specific integrated circuit, in logic implemented in the processor 1602, in a co-processor on a peripheral device or card, etc. In some embodiments, the communication unit 1608 can each be implemented on a system-on-a-chip (SoC), an application specific integrated circuit (ASIC), or another suitable integrated circuit to enable communications of the electronic device 1600. In some embodiments, the communication unit 1608 may include additional processors and memory, and may be implemented in one or more integrated circuits on one or more circuit boards of the electronic device 1600. Further, realizations may include fewer or additional components not illustrated in FIG. 16 (e.g., video cards, audio cards, network interfaces, peripheral devices, etc.). For example, in addition to the processor 1602 coupled with the bus 1610, the communication unit 1608 may include at least one additional processor. As another example, although illustrated as being coupled to the bus 1610, the memory 1606 may be coupled to the processor 1602.

While the embodiments are described with reference to various implementations and exploitations, it will be understood that these embodiments are illustrative and that the scope of the disclosure is not limited to them. In general, techniques for power conservation of a WLAN-capable remote control device as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
   transmitting a first user input from a first network device to a second network device on a first communication channel, wherein the first user input is for controlling operation of the second network device;
   determining whether the second network device is operating on the first communication channel based, at least in part, on not receiving an acknowledgment message from the second network device on the first communication channel; and
   scanning a plurality of communication channels according to a channel scan sequence in response to determining that the second network device is not operating on the first communication channel, wherein the channel scan sequence is determined based, at least in part, on operating state feedback previously received from the second network device.

2. The method of claim 1, further comprising:
   transmitting the first user input and an operating state feedback request from the first network device to the second network device in response to not receiving the acknowledgment message from the second network device on the first communication channel.

3. The method of claim 1, further comprising transmitting an operating state feedback request from the first network device to the second network device in response to at least one of:
   determining that a predetermined retransmission time interval for transmitting the first user input to the second network device has elapsed,
   determining that a predetermined number of retransmission attempts for transmitting the first user input to the second network device has elapsed, and
   determining that the first user input matches a predetermined user input.

4. The method of claim 1, further comprising:
   transmitting an operating state feedback request from the first network device to the second network device; and
   determining to remain configured in an active operating state until a new operating state feedback is received from the second network device or a predefined time interval elapses.

5. The method of claim 1, wherein the operating state feedback of the second network device comprises at least one of:
   whether the second network device is configured in an active operating state,
   whether the second network device is associated with an access point,
   an identification of an operating communication channel on which the second network device is configured to communicate with the access point,
   an identification of a time interval for which the second network device is configured to operate in the active operating state, and
   an identification of a time interval for which the second network device is configured to operate in a sleep operating state.

6. The method of claim 1, further comprising:
   determining not to retransmit the first user input to the second network device on the first communication channel after a predetermined retransmission time interval elapses; and
   transmitting an operating state feedback request from the first network device to the second network device on the first communication channel after determining not to retransmit the first user input.

7. The method of claim 1, wherein in response to not receiving the acknowledgment message from the second network device on the first communication channel, further comprising:

embedding an operating state feedback request in a retransmission of the first user input from the first network device to the second network device on the first communication channel.

8. The method of claim 1, further comprising:
receiving the acknowledgment message from the second network device in response to transmitting an operating state feedback request from the first network device to the second network device;
determining that the acknowledgment message does not include a new operating state feedback of the second network device; and
determining to use the operating state feedback previously received from the second network device in response to determining that the acknowledgment message does not include the new operating state feedback.

9. The method of claim 1, further comprising:
receiving a second user input at the first network device for transmission to the second network device;
determining whether the first network device is transmitting the first user input to the second network device; and
determining whether to transmit the second user input to the second network device based, at least in part, on whether the first network device is transmitting the first user input to the second network device.

10. The method of claim 9, wherein, in response to determining that the first network device is transmitting the first user input to the second network device, the method comprises:
determining whether the second user input is a duplicate of the first user input;
transmitting the first user input and the second user input from the first network device to the second network device in response to determining that the second user input is not a duplicate of the first user input; and
extending a retransmission time interval associated with transmitting the first user input in response to determining that the second user input is a duplicate of the first user input.

11. The method of claim 9, wherein, in response to determining that the first network device is transmitting the first user input to the second network device, the method comprises:
transmitting the first user input and the second user input from the first network device to the second network device.

12. The method of claim 9, wherein, in response to determining that the first network device is transmitting the first user input to the second network device, the method comprises:
determining not to retransmit the first user input and the second user input after a predetermined retransmission time interval elapses; and
transmitting an operating state feedback request from the first network device to the second network device after the predetermined retransmission time interval elapses.

13. The method of claim 1, further comprising:
transitioning to an active operating state at the first network device in response to receiving the first user input;
determining that the second network device is operating on a second communication channel in response to receiving an acknowledgment message from the second network device on the second communication channel after transmitting the first user input on the second communication channel; and
transitioning from the active operating state to an inactive operating state at the first network device in response to receiving the acknowledgment message from the second network device on the second communication channel.

14. The method of claim 1, wherein in response to not receiving the acknowledgment message from the second network device on the first communication channel, the method comprises:
retransmitting the first user input on the first communication channel for a predetermined retransmission time interval; and
determining that the second network device is not operating on the first communication channel based, at least in part, on not receiving the acknowledgment message after the predetermined retransmission time interval elapses.

15. The method of claim 1, further comprising:
determining successful transmission of the first user input from the first network device to the second network device on a second communication channel; and
transitioning the first network device from an active operating state to a sleep operating state, wherein the sleep operating state is between the active operating state and an inactive operating state.

16. The method of claim 15, wherein, while the first network device is configured in the sleep operating state, the method further comprises:
in response to receiving a second user input at the first network device, transitioning the first network device from the sleep operating state to the active operating state to transmit the second user input to the second network device; and
in response to determining that a predetermined time interval has elapsed, transitioning the first network device from the sleep operating state to the inactive operating state.

17. The method of claim 15, wherein the first user input is provided in response to activating a trigger mechanism of the first network device.

18. The method of claim 1, further comprising:
determining successful transmission of the first user input from the first network device to the second network device on a second communication channel;
transitioning the first network device from an active operating state to a sleep operating state, wherein the sleep operating state is between the active operating state and an inactive operating state; and
after a predetermined time interval elapses, automatically transitioning the first network device from the sleep operating state to the active operating state to transmit a second user input.

19. The method of claim 18, further comprising:
transmitting a feedback request from the first network device to the second network device, wherein a response to the feedback request indicates whether the first network device should continue to provide subsequent user inputs to the second network device.

20. The method of claim 18, further comprising:
determining whether a difference between the first user input and the second user input exceeds a predetermined threshold;
transmitting the second user input from the first network device to the second network device in response to determining that the difference between the first user input and the second user input exceeds the predetermined threshold; and
determining not to retransmit the second user input from the first network device to the second network device in response to determining that the difference between the first user input and the second user input does not exceed the predetermined threshold.

21. The method of claim 18, wherein:
the first user input and the second user input each include sensor information that represents a gesture input, or
the first user input and the second user input each include voice samples that represent a voice input.

22. The method of claim 1, further comprising:
selecting a first communication parameter of the first network device for transmitting the first user input from the first network device to the second network device on the first communication channel; and
after a predetermined retransmission time interval elapses, selecting a second communication parameter of the first network device for retransmitting the first user input from the first network device to the second network device on the first communication channel.

23. The method of claim 1, further comprising:
determining a performance measurement associated with the first communication channel between the first network device and the second network device; and
determining whether to present a link status regarding the first communication channel based, at least in part, on comparing the performance measurement to a threshold.

24. The method of claim 23, further comprising:
presenting the link status to indicate that the first network device will lose connectivity to the second network device in response to determining that the performance measurement is not in accordance with the threshold.

25. The method of claim 23, wherein said transmitting the first user input from the first network device to the second network device is in response to:
determining that the first network device will not lose connectivity to the second network device; or
after presenting the link status, determining that the first network device is within a communication coverage range of the second network device.

26. The method of claim 1, further comprising presenting a notification at the first network device to execute operations for pairing between the first network device and the second network device in response to:
determining that a predetermined number of user inputs were not successfully transmitted from the first network device to the second network device, or
determining that the second network device was not detected on the plurality of communication channels.

27. The method of claim 1, wherein the first network device is a remote control device and the second network device is a consumer electronic device.

28. The method of claim 1, wherein the first network device and the second network device each include wireless local area network (WLAN) capabilities.

29. A method comprising:
transmitting a first user input from a first network device to a second network device, wherein the first user input is for controlling operation of the second network device;
embedding an operating state feedback request in a retransmission of the first user input from the first network device to the second network device in response to not receiving an acknowledgment message from the second network device; and
determining a first communication channel to be used for retransmitting the first user input from the first network device to the second network device based, at least in part, on operating state feedback previously received from the second network device.

30. The method of claim 29, wherein said determining the first communication channel to be used for retransmitting the first user input comprises:
scanning a plurality of communication channels according to a channel scan sequence to detect the second network device, wherein the channel scan sequence is determined based, at least in part, on the operating state feedback previously received from the second network device.

31. The method of claim 29, further comprising:
receiving a new operating state feedback from the second network device in response to the operating state feedback request;
determining that the second network device will transition from the first communication channel to a second communication channel based, at least in part, on a channel scan sequence, wherein the channel scan sequence is determined based, at least in part, on the new operating state feedback; and
retransmitting a subsequent user input on the second communication channel from the first network device to the second network device.

32. The method of claim 29, further comprising:
determining that a new operating state feedback was not received from the second network device in response to the operating state feedback request; and
retransmitting the first user input and the operating state feedback request from the first network device to the second network device via the first communication channel.

33. The method of claim 29, wherein said embedding the operating state feedback request in the retransmission of the first user input is in response to receiving a predefined user input at the first network device, wherein the predefined user input causes the first network device to request the operating state feedback from the second network device.

34. A first network device comprising:
a processor; and
a communication unit coupled with the processor, the communication unit configured to:
transmit a first user input to a second network device on a first communication channel, wherein the first user input is for controlling operation of the second network device;
determine whether the second network device is operating on the first communication channel based, at least in part, on not receiving an acknowledgment message from the second network device on the first communication channel; and
scan a plurality of communication channels according to a channel scan sequence in response to determining that the second network device is not operating on the first communication channel, wherein the channel scan sequence is determined based, at least in part, on operating state feedback previously received from the second network device.

35. The first network device of claim 34, wherein in response to not receiving the acknowledgment message from the second network device on the first communication channel, the communication unit is further configured to:
embed an operating state feedback request in a retransmission of the first user input from the first network device to the second network device on the first communication channel.

36. The first network device of claim 34, wherein the communication unit is further configured to:

receive a second user input for transmission to the second network device;

determine whether the first network device is transmitting the first user input to the second network device; and determine whether to transmit the second user input to the second network device based, at least in part, on whether the first network device is transmitting the first user input to the second network device.

37. A non-transitory machine-readable storage medium having machine executable instructions stored therein, the machine executable instructions comprising instructions to:

transmit a first user input from a first network device to a second network device on a first communication channel, wherein the first user input is for controlling operation of the second network device;

determine whether the second network device is operating on the first communication channel based, at least in part, on not receiving an acknowledgment message from the second network device on the first communication channel; and scan a plurality of communication channels according to a channel scan sequence in response to determining that the second network device is not operating on the first communication channel, wherein the channel scan sequence is determined based, at least in part, on operating state feedback previously received from the second network device.

38. The non-transitory machine-readable storage medium of claim 37, wherein in response to not receiving the acknowledgment message from the second network device on the first communication channel, said instructions further comprise instructions to:

embed an operating state feedback request in a retransmission of the first user input from the first network device to the second network device on the first communication channel.

39. The non-transitory machine-readable storage medium of claim 37, wherein said instructions further comprise instructions to:

receive a second user input for transmission to the second network device;

determine whether the first network device is transmitting the first user input to the second network device; and determine whether to transmit the second user input to the second network device based, at least in part, on whether the first network device is transmitting the first user input to the second network device.

* * * * *